United States Patent
Kilian et al.

(10) Patent No.: US 11,483,015 B2
(45) Date of Patent: Oct. 25, 2022

(54) PACKET DETECTOR/DECODER FOR A RADIO TRANSMISSION SYSTEM

(71) Applicant: Fraunhofer-Gesellschaft zur Förderung der angewandten Forschung e.V., Munich (DE)

(72) Inventors: Gerd Kilian, Erlangen (DE); Jakob Kneissl, Erlangen (DE); Eberhard Gamm, Ebermannstadt (DE); Josef Bernhard, Erlangen (DE); Robert Koch, Erlangen (DE); Martin Kohlmann, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 44 days.

(21) Appl. No.: 17/074,883

(22) Filed: Oct. 20, 2020

(65) Prior Publication Data

US 2021/0036721 A1 Feb. 4, 2021

Related U.S. Application Data

(63) Continuation of application No. PCT/EP2019/059941, filed on Apr. 17, 2019.

(30) Foreign Application Priority Data

Apr. 20, 2018 (DE) .......................... 102018206159.9

(51) Int. Cl.
*H04W 84/12* (2009.01)
*H04B 1/00* (2006.01)
(Continued)

(52) U.S. Cl.
CPC ........... *H04B 1/0021* (2013.01); *H04B 1/713* (2013.01); *H04L 1/0047* (2013.01);
(Continued)

(58) Field of Classification Search
CPC ............. H04W 84/12; H04W 72/0453; H04W 72/0446; H04W 74/0816; H04W 16/28;
(Continued)

(56) References Cited

U.S. PATENT DOCUMENTS 5,588,028 A 12/1996 Parizhsky
6,208,842 B1 3/2001 Henderson et al.
(Continued)

FOREIGN PATENT DOCUMENTS

DE 102011082098 B4 3/2013
EP 3125453 A1 2/2017
(Continued)

OTHER PUBLICATIONS

Harris, F., et al., "An Efficient Full Digital Frequency Hopping Demodulator Based on Polyphase Filter Banks",, SDR11-WInnComm, Nov. 29, 2011, pp. 1-5, XP055625239, Nov. 29, 2011.
(Continued)

*Primary Examiner* — Eva Y Puente
(74) *Attorney, Agent, or Firm* — Perkins Coie LLP; Michael A. Glenn

(57) ABSTRACT

Embodiments provide a data receiver, wherein the data receiver is configured to receive a broadband signal, wherein the broadband signal includes at least two partial data packets that are distributed in time and/or frequency, wherein the data receiver is configured to perform detection of the at least two partial data packets in the broadband signal and to provide at least one detection parameter for the detected partial data packets, wherein the data receiver is configured to perform decoding of the detected partial data packet by using the at least one detection parameter, wherein the data receiver is configured to perform or process detection and decoding separately from one another.

44 Claims, 14 Drawing Sheets

(51) Int. Cl.
  *H04B 1/713* (2011.01)
  *H04L 1/00* (2006.01)
  *H04L 5/00* (2006.01)
(52) U.S. Cl.
  CPC .......... *H04L 1/0052* (2013.01); *H04L 5/0005* (2013.01); *H04W 84/12* (2013.01)
(58) Field of Classification Search
  CPC ..... H04W 24/10; H04W 76/15; H04W 80/02; H04W 24/08; H04W 56/001; H04W 72/042; H04W 72/085; H04L 5/0053; H04L 5/0007; H04L 27/2602; H04L 5/0048; H04L 69/22; H04L 5/0094; H04L 65/80; H04L 1/0003; H04L 1/0026; H04L 5/001; H04L 5/0023; H04L 1/0009; H04B 7/0452; H04B 7/0617; H04B 7/0413; H04B 7/0619; H04B 7/0632; H04B 10/11; H04B 10/116; H04B 10/616; H04B 17/309; H04B 17/318; H04B 1/16; H04B 1/40; H04B 7/00
  USPC .................................. 375/260, 350; 370/503
  See application file for complete search history.

(56) References Cited

U.S. PATENT DOCUMENTS

| | | | |
|---|---|---|---|
| 9,354,081 B2 | 5/2016 | Bernhard et al. | |
| 10,567,111 B2 | 2/2020 | Kilian et al. | |
| 2004/0190560 A1* | 9/2004 | Maltsev | H04L 27/2665 |
| | | | 370/503 |
| 2004/0213327 A1 | 10/2004 | Mills et al. | |
| 2006/0245452 A1 | 11/2006 | Frederiksen et al. | |
| 2007/0211785 A1 | 9/2007 | Nakache et al. | |
| 2008/0240159 A1 | 10/2008 | Palanki et al. | |
| 2009/0207925 A1* | 8/2009 | Liu | H04L 27/2647 |
| | | | 375/260 |
| 2010/0177857 A1* | 7/2010 | Huttunen | H04L 27/2614 |
| | | | 375/350 |
| 2012/0254703 A1 | 10/2012 | Rubin | |
| 2015/0124710 A1 | 5/2015 | Sun et al. | |
| 2020/0270696 A1* | 8/2020 | Villemoes | G10L 19/0204 |
| 2021/0199746 A1* | 7/2021 | Gao | G01S 5/0273 |

FOREIGN PATENT DOCUMENTS

| | | |
|---|---|---|
| JP | 2003511896 A | 3/2003 |
| JP | 2010516109 A | 5/2010 |
| JP | 2015513828 A | 5/2015 |
| JP | 2016541166 A | 12/2016 |
| WO | 2013123441 A1 | 8/2013 |
| WO | 2016129256 A1 | 8/2016 |
| WO | 2017023381 A1 | 2/2017 |
| WO | 2018059782 A1 | 4/2018 |

OTHER PUBLICATIONS

Harris, F., et al., "Polyphase analysis filter bank down-converts unequal channel bandwidths with arbitrary center Frequencies",, Analog Integrated Circuits and Signal Processing, Kluwer Academic Publishers, vol. 71, No. 3, (Sep. 22, 2011), pp. 481-494, XP035053645, ISSN: 1573-1979, DOI: 10.1007/S10470-011-9746-Y, Sep. 22, 2011.

Jaiswal, K. , "Spectral Sensing of Adaptive Frequency Hopping Signal for Cognitive Radio.", IEEE International Performance, Computing and Communications Conference, Dec. 7-9, 2008, pp. 360-365, Dec. 2008.

* cited by examiner

PACKET DETECTOR/DECODER FOR A RADIO TRANSMISSION SYSTEM

CROSS-REFERENCE TO RELATED APPLICATIONS

This application is a continuation of copending International Application No. PCT/EP2019/059941, filed Apr. 17, 2019, which is incorporated herein by reference in its entirety, and additionally claims priority from German Application No. 102018206159.9, filed Apr. 20, 2018, which is also incorporated herein by reference in its entirety.

Embodiments relate to a data receiver and in particular to a data receiver for receiving a broadband signal comprising several partial data packets distributed in time and frequency according to a time frequency hopping pattern. Some embodiments relate to a packet detector/decoder for a radio transmission system.

BACKGROUND OF THE INVENTION

From DE 10 2011 082 098 B4, a telegram splitting based radio transmission system is known, wherein a data packet (or telegram) to be transmitted is divided into a plurality of partial data packets, wherein the plurality of partial data packets are each shorter than the data packets, and wherein the plurality of partial data packets are transmitted distributed in time and frequency according to a time frequency hopping pattern.

When emitting a plurality of data packets divided into a plurality of partial data packets simultaneously or in a time-overlapping manner by a plurality of data transmitters, the computing power needed in the data receiver for detecting and decoding the partial data packets increases significantly.

SUMMARY

An embodiment may have a data receiver, wherein the data receiver is configured to receive a broadband signal, wherein the broadband signal comprises at least two partial data packets that are distributed in time and/or frequency, wherein the data receiver is configured to perform detection of the at least two partial data packets in the broadband signal and to provide at least one detection parameter for the detected partial data packets, wherein the data receiver is configured to perform decoding of the detected partial data packets by using the at least one detection parameter, wherein the data receiver is configured to perform or process detection and decoding separately from one another, wherein the at least two partial data packets comprise pilot sequences, wherein the data receiver is configured to detect the at least two partial data packets in the broadband signal based on the pilot sequences, wherein the data receiver is configured to perform decoding in dependence on available computing power of the data receiver, wherein the data receiver is configured to perform decoding of one of the detected partial data packets when sufficient computing power is available.

According to another embodiment, a method for receiving a broadband signal, wherein the broadband signal comprises at least two partial data packets that are distributed across different frequencies, may have the steps of: detecting the at least two partial data packets in the broadband signal to provide at least one detection parameter for the detected partial data packets, decoding the detected partial data packets by using the detection parameters, wherein detection and decoding are performed or processed separately from one another, wherein the at least two partial data packets comprise pilot sequences, wherein the at least two partial data packets in the broadband signal are detected based on the pilot sequences, wherein decoding is performed in dependence on available computing power, wherein decoding of one of the detected partial data packets is performed when sufficient computing power is available.

Another embodiment may have a non-transitory digital storage medium having a computer program stored thereon to perform the method for receiving a broadband signal, wherein the broadband signal comprises at least two partial data packets that are distributed across different frequencies, wherein the method may have the steps of: detecting the at least two partial data packets in the broadband signal to provide at least one detection parameter for the detected partial data packets, decoding the detected partial data packets by using the detection parameters, wherein detection and decoding are performed or processed separately from one another, wherein the at least two partial data packets comprise pilot sequences, wherein the at least two partial data packets in the broadband signal are detected based on the pilot sequences, wherein decoding is performed in dependence on available computing power, wherein decoding of one of the detected partial data packets is performed when sufficient computing power is available, when said computer program is run by a computer.

Another embodiment may have a data receiver, wherein the data receiver is configured to receive a broadband signal, wherein the broadband signal comprises at least two partial data packets that are distributed in time and/or frequency, wherein the data receiver comprises a first filterbank that is configured to divide the received broadband signal into a plurality of subband signals for detecting the partial data packets, wherein the plurality of subband signals comprise different subbands of the broadband signal, wherein the filterbank comprises a polyphase filter; wherein the data receiver comprises a detector that is configured to detect the at least two partial data packets in the different subbands of the plurality of subband signals of the first filterbank to provide detection parameters for the detected partial data packets, wherein the data receiver comprises a second filterbank that is configured to divide the received broadband signal into a plurality of subband signals for decoding the partial data packets, wherein the plurality of subband signals comprise different subbands of the broadband signal, wherein the second filterbank comprises a polyphase filter, wherein the data receiver comprises a decoder that is configured to extract detected partial data packets from the respective subband signals of the second filterbank by using detection parameters, wherein a sampling rate $f_{IM}$ of the plurality of subband signals provided by the second filterbank for decoding the partial data packets is greater than a sampling rate $f_{DET}$ of the plurality of subband signals provided by the first filterbank for detecting the partial data packets and/or wherein a number of subband signals $N_{IM}$ of the subband signals provided by the second filterbank for decoding the partial data packets is lower than a number of subband signals N of the subband signals provided by the first filterbank for detecting the partial data packets.

According to another embodiment, a method for receiving a broadband signal, wherein the broadband signal comprises at least two partial data packets that are distributed across different frequencies, may have the steps of: filtering the received broadband signal with a first filterbank to divide the received broadband signal into a plurality of subband signals for detecting the partial data packets, wherein the plurality of subband signals comprise different subbands of the broadband signal, wherein the first filterbank comprises a polyphase filter, detecting the at least two partial data packets in the different subbands of the plurality of subband signals of the first filterbank to provide detection parameters for the detected partial data packets, filtering the received broadband signal with a second filterbank to divide the received broadband signal into a plurality of subband signals for decoding the partial data packets, wherein the plurality of subband signals comprise different subbands of the broadband signal, wherein the second filterbank comprises a polyphase filter, extracting the detected partial data packets from the respective subband signals of the second filterbank by using detection parameters and decoding the extracted partial data packets, wherein a sampling rate $f_{IM}$ of the plurality of subband signals provided by the second filterbank for decoding the partial data packets is greater than a sampling rate $f_{DET}$ of the plurality of subband signals provided by the first filterbank for detecting the partial data packets and/or wherein a number of subband signals $N_{IM}$ of the subband signals provided by the second filterbank for decoding the partial data packets is lower than a number of subband signals N of the subband signals provided by the first filterbank for detecting the partial data packets.

Another embodiment may have a non-transitory digital storage medium having a computer program stored thereon to perform the method for receiving a broadband signal, wherein the broadband signal comprises at least two partial data packets that are distributed across different frequencies, the method having the steps of: filtering the received broadband signal with a first filterbank to divide the received broadband signal into a plurality of subband signals for detecting the partial data packets, wherein the plurality of subband signals comprise different subbands of the broadband signal, wherein the first filterbank comprises a polyphase filter, detecting the at least two partial data packets in the different subbands of the plurality of subband signals of the first filterbank to provide detection parameters for the detected partial data packets, filtering the received broadband signal with a second filterbank to divide the received broadband signal into a plurality of subband signals for decoding the partial data packets, wherein the plurality of subband signals comprise different subbands of the broadband signal, wherein the second filterbank comprises a polyphase filter, extracting the detected partial data packets from the respective subband signals of the second filterbank by using detection parameters and decoding the extracted partial data packets, wherein a sampling rate $f_{IM}$ of the plurality of subband signals provided by the second filterbank for decoding the partial data packets is greater than a sampling rate $f_{DET}$ of the plurality of subband signals provided by the first filterbank for detecting the partial data packets and/or wherein a number of subband signals $N_{IM}$ of the subband signals provided by the second filterbank for decoding the partial data packets is lower than a number of subband signals N of the subband signals provided by the first filterbank for detecting the partial data packets, when said computer program is run by a computer.

Embodiments provide a data receiver, wherein the data receiver is configured to receive a broadband signal, wherein the broadband signal comprises at least two partial data packets [e.g. wherein the at least two partial data packets comprise different parts of a data packet] that are distributed in time and/or frequency [e.g. according to a hopping pattern], wherein the data receiver [e.g. comprises a detector that] is configured to perform detection of the at least two partial data packets in the broadband signal and to provide at least one detection parameter [e.g. detection instant and/or detection frequency] for the detected partial data packets [for example to provide a detection parameter (e.g. detection instant and/or detection frequency) for each of the detected partial data packets or, for example, to provide only one detection parameter (e.g. (reference) detection instant and/or (reference) detection frequency) for the hopping pattern of the at least two partial data packets, wherein receiving instants and/or receiving frequencies of the at least two partial data packets are implicitly known by the definition of the hopping pattern], wherein the data receiver [e.g., comprises a decoder that] is configured to perform decoding of the detected partial data packets by using the at least one detection parameter, wherein the data receiver is configured to perform or process detection [of the at least two partial data packets] and decoding [of the detected partial data packets] separately from one another.

In embodiments, the detection parameters can relate, for example to the data packets in the sense such that the same specify a reference point from where localization of the partial data packets can take place with the help of a hopping pattern. At the reference point itself is normally no partial data packet since normally no partial data packet having the time offset=0 and the frequency offset=0 is included in the hopping patterns.

In embodiments, the detection parameters allow localization of the partial data packets of the detected data packets by serving as reference points for the hopping patterns.

In embodiments, the data receiver [e.g. the detector of the data receiver] can be configured to perform the detection continuously.

In embodiments, the data receiver [e.g. the decoder of the data receiver] can be configured to perform decoding in dependence on available computing power of the data receiver [e.g. to perform decoding of one of the detected partial data packets when sufficient computing power is available].

In embodiments, the data receiver can be configured to perform or to process detection and decoding in different [e.g. separate] processes.

In embodiments, the data receiver can be configured to perform or process detection and decoding on different [e.g. separate] processors of the data receiver or on different [e.g. separate] processor kernels or threads of a processor of the data receiver.

In embodiments, the data receiver can comprise separate signal processing means [e.g. detector in FPGA, decoder in DSP or GPP] connected to one another via a data interface, wherein the data receiver is configured to perform or process detection and decoding on different signal processing means.

In embodiments, the at least two partial data packets can include a first plurality of partial data packets and a second plurality of partial data packets, wherein the first plurality of partial data packets comprise first data [e.g. a first telegram or a first partial data packet] that are transmitted divided into the first plurality of partial data packets distributed on several frequency channels [e.g. according to a hopping pattern] and at different time instants, wherein the second plurality of partial data packets comprise second data [e.g. a second telegram or a second partial data packet] that are transmitted distributed on several frequency channels divided into the second plurality of partial data packets [e.g. according to a hopping pattern] and at different time instants, wherein the data receiver is configured to perform decoding of detected partial data packets of the first plurality of partial data packets and decoding of detected partial data packets of the second plurality of partial data packets in parallel [e.g. in different (e.g. separate) processes].

In embodiments, the first plurality of partial data packets and the second plurality of partial data packets can be transmitted by the same data transmitter.

In embodiments, the first plurality of partial data packets and the second plurality of partial data packets can be transmitted by different data transmitters.

In embodiments, the data receiver can be configured to start decoding of the detected partial data packets of the first plurality of partial data packets or the second plurality of partial data packets independent of the other decoding, when all partial data packets of the respective plurality of partial data packets have been detected or when, by considering an encoding introducing transmitter-side redundancy, sufficient partial data packets of the respective plurality of partial data packets have been detected for a probably successful decoding.

In embodiments, the data receiver can be configured [e.g. the data receiver can comprise a signal ring buffer that can be configured] to cache the received broadband signal or a further processed version of the broadband signal [e.g. a version of the broadband signal divided into a plurality of subband signals (e.g. a version of the broadband signal fragmented into subbands)] for decoding [for example, a ring buffer having the maximum delay length of the signal (plus possible processing times) can be used].

The data receiver can comprise, for example a ring buffer, wherein the ring buffer has the maximum delay length of the signal (plus possible processing times).

In embodiments, the further processed version of the broadband signal can be a version of the broadband signal divided into a plurality of subband signals.

In embodiments, the data receiver can be configured to cache a version of the broadband signal or the further processed version of the broadband signal undersampled in time and/or frequency.

For example, only every second, third, fourth frequency line and/or time line may be stored to reduce the memory requirements.

In embodiments, the data receiver [e.g. the signal ring buffer of the data receiver] can be configured to cache the received broadband signal, wherein the data receiver [e.g. the decoder of the data receiver] is configured to perform undersampling $U$ ($=f_{WB}/f_{SYNC}=M_{WB}/M_{SYNC}$) [e.g. such that a sampling rate $f_{SYNC}$ ($=M_{SYNC} \cdot f_{sym}$) of a further processed version of the received broadband signal [e.g. a filtered version (e.g. a channel filter and/or a matched filter) of the received broadband signal divided into a plurality of subband signals) is lower than a sampling rate $f_{WB}$ ($=M_{WB} \cdot f_{sym}$) of the received broadband signal].

In embodiments, the data receiver can be configured [e.g. the detector of the data receiver can comprise a first filterbank that can be configured] to divide the broadband signal into a plurality of subband signals for detecting the plurality of partial data packets, wherein the plurality of subband signals comprise different [e.g. partly overlapping] subbands of the broadband signal, wherein the data receiver [e.g. the detector of the data receiver] is configured to perform detection of the at least two partial data packets in the different subbands of the plurality of subband signals [e.g. by correlation of the plurality of subband signals with a (known) synchronization sequence or synchronization sequences contained in the partial data packets].

In embodiments, the data receiver [e.g. the first filterbank of the detector of the data receiver] can be configured to divide the broadband signal into the plurality of subband signals by polyphase filtering or a polyphase filterbank [e.g. and N point DFT or N point FFT].

In embodiments, the data receiver [e.g. the first filterbank of the detector of the data receiver] can be configured to perform undersampling $U_{DET}$ ($=f_{WB}/f_{DET}=M_{WB}/M_{DET}$) when dividing the broadband signal into the plurality of subband signals [e.g. such that the sampling rate $f_{DET}$ ($=M_{DET} \cdot f_{sym}$) of the plurality of subband signals is lower than the sampling rate $f_{WB}$ ($=M_{WB} \cdot f_{sym}$) of the received broadband signal].

In embodiments, the at least two partial data packets can include a first plurality of partial data packets, wherein the first plurality of partial data packets comprise first data [e.g. a first telegram or a first partial data packet] that are transmitted divided into the first plurality of partial data packets distributed on several frequency channels and at different time instants, wherein the data receiver [e.g. the detector of the data receiver] is further configured to determine a [e.g. coarse] frequency and/or time offset of the detected partial data packets of the first data, wherein the detection parameters further comprise the determined [e.g. coarse or estimated] frequency and/or time offset.

In embodiments, the plurality of subband signals into which the broadband signal is divided can be the further processed version of the broadband signal that is cached for decoding [e.g. in the signal ring buffer], wherein the data receiver [e.g. the decoder of the data receiver] is configured to extract [and, e.g., to decode] the detected partial data packets by using the detection parameters [e.g. detection time instants and/or detection frequencies] from the respective cached (e.g. in the signal ring buffer) subband signals [e.g. by filtering (e.g. channel filter and/or matched filter) and/or (fine) (time and/or frequency) synchronization].

In embodiments, the data receiver [e.g. the decoder of the data receiver] can be configured to perform oversampling M ($=f_{SYNC}/f_{DET}=M_{SYNC}/M_{DET}$) of the plurality of cached subband signals [e.g. such that a sampling rate $f_{SYNC}$ ($=M_{SYNC} \cdot f_{SYM}$) of a further processed version [e.g. a filtered version (e.g. interpolation filter) of the plurality of cached subband signals] is greater than a sampling rate $f_{DET}$ ($=M_{DET} \cdot f_{SYM}$) of the plurality of cached subband signals.

In embodiments, the data receiver can be configured [e.g. the decoder of the data receiver can comprise a second filterbank that can be configured] to divide the broadband signal into a plurality of subband signals for decoding the detected partial data packets, wherein the plurality of subband signals comprise different [e.g. partly overlapping] subbands of the broadband signal, wherein the data receiver [e.g. the decoder of the data receiver] is configured to extract [and, e.g. to decode] the detected partial data packets from the respective subband signals [e.g. by filtering (e.g. channel filter and/or matched filter) and/or (fine) (time and/or frequency) synchronization] by using the detection parameters [e.g. detection time instants and/or detection frequencies].

In embodiments, the data receiver [e.g. the decoder of the data receiver] can be configured to select a respective suitable subband signal of the plurality of subband signals for decoding the detected partial data packets and to extract the detected partial data packets from the respective subband signals [for example, the data receiver can select, by using the respective detection parameters (e.g. detection instants and/or detection frequencies) suitable (time) portions of suitable subband signals for decoding the respective detected partial data packets and can extract [and, e.g., decode] the respective detected partial data packets from the selected subband signals [e.g. by filtering (e.g. channel filter and/or matched filter) and/or (fine) (time and/or frequency) synchronization].

In embodiments, the data receiver [e.g. the second filterbank of the decoder of the data receiver] can be configured to divide the broadband signal into the plurality of subband signals by polyphase filtering or polyphase filterbank [e.g. and an N point DFT or N point FFT].

In embodiments, the data receiver [e.g. the second filterbank of the decoder of the data receiver] can be configured to perform undersampling $U_{IM}$ ($=f_{WB}/f_{IM}=M_{WB}/M_{IM}$) when dividing the broadband signal into the plurality of subband signals [e.g. such that a sampling rate $f_{IM}$ ($=M_{IM}\cdot f_{sym}$) of the plurality of subband signals is lower than a sampling rate $f_{WB}$ ($=M_{WB}\cdot f_{sym}$) of the received broadband signal].

In embodiments, the data receiver [e.g. the second filterbank of the decoder of the data receiver] can be configured to divide the broadband signal into a plurality of subband signals with overlapping subbands, wherein the subbands [e.g. each] can overlap by at least one bandwidth of one of the partial data packets [for example, passbands of adjacent filter channels of the second filterbank can overlap by at least the bandwidth of one of the partial data packets so that the partial data packets can be extracted from one of two overlapping filter channels without significant distortion].

In embodiments, the data receiver [e.g. the second filterbank of the decoder of the data receiver] can be configured to divide the broadband signal into a plurality of subband signals with overlapping subbands, wherein, when dividing [e.g. filtering (e.g. polyphase filtering)] the broadband signal, a sum of a bandwidth of a passband for one of the subband signals and of a stop bandwidth [e.g. width of the transition from passband to stopband] of one of the subband signals adjacent to the subband signal is not greater than twice the sampling rate $f_{IM}$ ($=M_{IM}\cdot f_{sym}$) of the plurality of subband signals [e.g. the stop bandwidth may not be greater than the passband].

In embodiments, the data receiver [e.g. the decoder of the data receiver] can be configured to perform resampling U ($=f_{IM}/f_{SYNC}=M_{IM}/M_{SYNC}$) of the plurality of subband signals [e.g. such that a sampling rate $f_{SYNC}$ of a further processed version of the plurality of subband signals [e.g. a filtered version (e.g. channel filter and/or matched filter) of the plurality of subband signals] is higher or lower than a sampling rate $f_{IM}$ of the plurality of subband signals].

In embodiments, resampling can be undersampling U ($=f_{IM}/f_{SYNC}=M_{IM}/M_{SYNC}$) [e.g. such that a sampling rate $f_{SYNC}$ of a further processed version of the plurality of subband signals [e.g. a filtered version (e.g. channel filter and/or matched filter) of the plurality of subband signals] is lower than a sampling rate $f_{IM}$ of the plurality of subband signals].

In embodiments, a sampling rate $f_{IM}$ ($=M_{IM}\cdot f_{sym}$) of the plurality of subband signals [e.g. provided by the second filterbank of the decoder] for decoding the detected partial data packets can be greater than a sampling rate $f_{DET}$ ($=M_{DET}\cdot f_{sym}$) of the plurality of subband signals [e.g. provided by the first filterbank of the detector] for detecting the at least two partial data packets.

In embodiments, a number of subband signals $N_{IM}$ of the subband signals [e.g. provided by the second filterbank of the decoder] for decoding the detected partial data packets can be lower than a number of subband signals N of the subband signals [e.g. provided by the first filterbank of the detector] for detecting the at least two partial data packets.

In embodiments, the data receiver can be configured to divide the received broadband signal by means of different filter characteristics into the plurality of subband signals for detecting the at least two partial data packets and the plurality of subband signals for decoding the detected partial data packets [for example, the first filterbank of the detector and the second filterbank of the detector can comprise different filter characteristics].

In embodiments, the different filters can comprise different frequency responses.

In embodiments, a bandwidth of a broadband signal can be at least so large that the at least two partial data packets can also be received by the data receiver at a maximum allowable frequency offset between data transmitter and data receiver [e.g. due to the inaccuracy of the used quartzes].

Further embodiments provide a method for receiving a broadband signal, wherein the broadband signal comprises at least two partial data packets that are distributed across different frequencies [e.g. frequency channels]. The method includes a step of detecting the at least two partial data packets in the broadband signal to provide at least one detection parameter for the detected partial data packets. Further, the method includes a step of decoding the detected partial data packets by using the detection parameters, wherein detection and decoding are performed or processed separately from one another.

Further embodiments provide a data receiver, wherein the data receiver is configured to receive a broadband signal, wherein the broadband signal comprises at least two partial data packets that are distributed [e.g. according to a hopping pattern] in time and/or frequency, wherein the data receiver comprises a filterbank that is configured to divide the received broadband signal into a plurality of subband signals for an [e.g. subsequent] detection or decoding of the partial data packets, wherein the plurality of subband signals comprise different [e.g. partly overlapping] subbands of the broadband signal, wherein the filterbank comprises a polyphase filter.

In embodiments, the filterbank can comprise an N point DFT or an N point FFT.

In embodiments, the filterbank can comprise an N channel mixer.

In embodiments, the filterbank can be configured to perform undersampling of the received broadband signal such that a sampling rate of the plurality of subband signals is lower than a sampling rate of the received broadband signal.

In embodiments, the filterbank can be a first filterbank that is configured to divide the received broadband signal into the plurality of subband signals for the [e.g. subsequent] detection of the partial data packets, wherein the data receiver comprises a second filterbank that is configured to divide the received broadband signal into a plurality of subband signals for [e.g. subsequent] decoding of the partial data packets, wherein the plurality of subband signals comprise different [e.g. partly overlapping] subbands of the broadband signal, wherein the second filterbank comprises a polyphase filter.

In embodiments, the second filterbank can comprise an N point DFT or an N point FFT.

In embodiments, the second filterbank can be configured to perform undersampling of the received broadband signal, such that a sampling rate of the plurality of subband signals is lower than a sampling rate of the received broadband signal.

In embodiments, the second filterbank can be configured to divide the broadband signal into a plurality of subband signals with overlapping subbands, wherein the subbands [e.g. each] overlap by at least one bandwidth of one of the partial data packets [for example, the passbands of adjacent filter channels of the second filterbank can overlap by at least the bandwidth of one of the partial data packets so that the partial data packets can be extracted from one of two overlapping filter channels without significant distortion].

In embodiments, the second filterbank can be configured to divide the broadband signal into a plurality of subband signals with overlapping subbands, wherein, when dividing [e.g. filtering (e.g. polyphase filtering)] the broadband signal, a sum of a bandwidth of a passband for one of the subband signals and of a stop bandwidth of one of the subband signals adjacent to the subband signal is not greater than twice the sampling rate of the plurality of subband signals.

In embodiments, a sampling rate $f_{IM}$ ($=M_{IM} \cdot f_{sym}$) of the plurality of subband signals provided by the second filterbank for decoding the partial data packets can be greater than a sampling rate $f_{DET}$ ($=M_{DET} \cdot f_{sym}$) of the plurality of subband signals provided by the first filterbank of the detector for detecting the partial data packets.

In embodiments, a number of subband signals $N_{IM}$ of the subband signals provided by the second filterbank for decoding the partial data packets can be lower than a number of subband signals N of the subband signals provided by the first filterbank for detecting the partial data packets.

In embodiments, the first filterbank and the second filterbank can comprise different filter characteristics.

In embodiments, the data receiver can comprise a detector that can be configured to detect the at least two partial data packets in the different subbands of the plurality of subband signals [e.g. by correlating the plurality of subband signals with a (known) synchronization sequence included in the partial data packets] to provide detection parameters [e.g. detection instants and/or detection frequencies] for the detected partial data packets [for example to provide at least one detection parameter (e.g. detection instant and/or detection frequency) for each of the detected partial data packets].

In embodiments, the data receiver can comprise a decoder that can be configured to extract [and, e.g., to decode] detected partial data packets from the respective subband signals by using detection parameters [e.g. by filtering (e.g. channel filter and/or matched filter) and/or (fine) (time and/or frequency) synchronization].

Further embodiments provide a method for receiving a broadband signal, wherein the broadband signal comprises at least two partial data packets that are distributed across different frequencies [e.g. frequency channels]. The method includes a step of filtering the received broadband signal with a filterbank to divide the received broadband signal into a plurality of subband signals for [e.g. subsequent] detection or decoding of the partial data packets, wherein the plurality of subband signals comprise different [e.g. partly overlapping] subbands of the broadband signal, wherein the filterbank comprises a polyphase filter.

BRIEF DESCRIPTION OF THE DRAWINGS

Embodiments of the present invention will be detailed subsequently referring to the appended drawings, in which.

DETAILED DESCRIPTION OF THE INVENTION

In the subsequent description of the embodiments of the present invention, equal or functionally equal elements are provided with the same reference numbers in the figures such that their description is inter-exchangeable.

1. TELEGRAM-SPLITTING BASED RADIO TRANSMISSION SYSTEM

Figure 1:
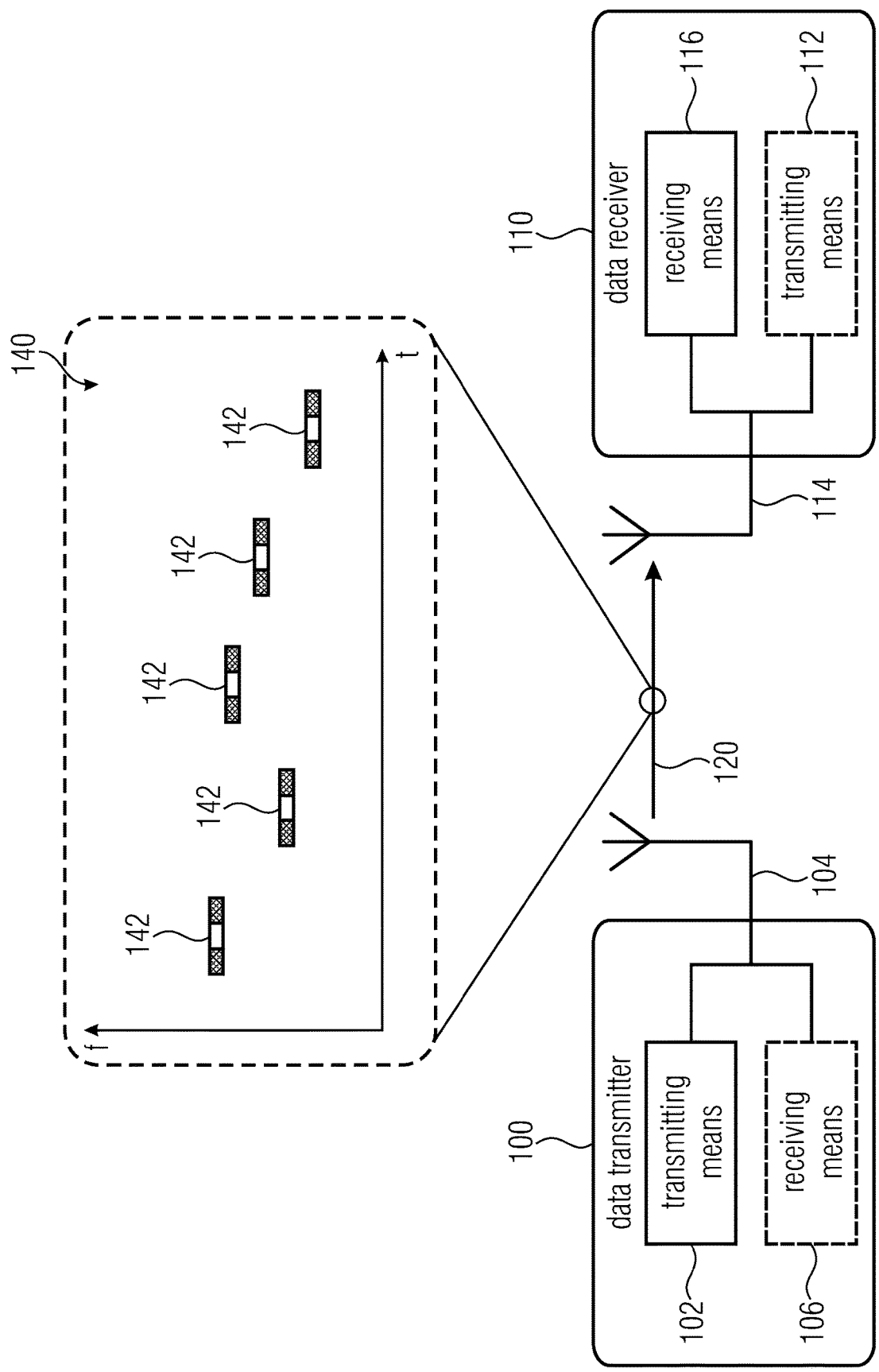
FIG. 1 is a schematic block diagram of a system with a data transmitter and a data receiver according to an embodiment of the present invention.

FIG. 1 shows a schematic block diagram of a system with a data transmitter 100 and a data receiver 110. The data transmitter 100 can be configured to transmit a signal 120, wherein the signal 120 comprises at least two separate partial data packets 142. The data receiver 110 can be configured to receive the signal 120 (or a version of the signal 120 modified by the transmission channel) that comprises the at least two separate partial data packets 142.

As can be seen in FIG. 1, the at least two separate partial data packets 142 are separated or spaced apart from another in time and/or in frequency. The distribution of the at least two separate partial data packets 142 in time and/or frequency can take place according to a hopping pattern 140.

In embodiments, the data transmitter 100 can comprise transmitting means (or a transmitting module or transmitter) 102 that is configured to transmit the signal 120. The transmitting means 102 can be connected to an antenna 104 of the data transmitter 100. Further, the data transmitter 100 can comprise receiving means (or a receiving module or receiver) 106 that is configured to receive a signal. The receiving means 106 can be connected to the antenna 104 or a further (separate) antenna of the data transmitter 100. The data transmitter 100 can also comprise a transceiver.

In embodiments, the data receiver 110 can comprise receiving means (or a receiving module or receiver) 116 that is configured to receive the signal 120. The receiving means 116 can be connected to an antenna 114 of the data receiver 110. Further, the data receiver 110 can comprise transmitting means (or a transmitting module or transmitter) 112 that is configured to transmit a signal. The transmitting means 112 can be connected to the antenna 114 or a further (separate) antenna of the data receiver 110. The data receiver 110 can also comprise a transceiver.

In embodiments, the data transmitter 100 can be a sensor node, while the data receiver 110 can be a base station. Typically, a communication system includes at least one data receiver 110 (base station) and a plurality of data transmitters (sensor nodes, such as heating meters). Obviously, it is also possible that the data transmitter 100 is a base station while the data receiver 110 is a sensor node. Further, it is possible that both the data transmitter 100 as well as the data receiver 110 are sensor nodes. Further, it is possible that both the data transmitter 100 and the data receiver 110 are base stations.

The data transmitter 100 and the data receiver 110 can be configured to transmit or receive data by using a telegram splitting method. Here, a data packet (or telegram) comprising the data is divided into a plurality of partial data packets (or subdata packets) 142 and the partial data 142 are transmitted from the data transmitter 100 to the data receiver 110, distributed in time and/or distributed in frequency according to a hopping pattern 140, wherein the data receiver 110 joins (or combines) the partial data packets 142 again to obtain the actual data packet. Each of the partial data packets 142 includes only part of the data packet 120. Further, the data packet can be channel-coded such that not all partial data packets 142, but only part of the partial data packets 142 are needed for error-free decoding of the data packet.

As already mentioned, the temporal distribution of the plurality of partial data packets 142, can take place according to a time and/or frequency pattern 140.

A time hopping pattern can indicate a sequence of transmitting instants or transmitting intervals at which the partial data packets are transmitted. For example, a first partial data packet can be transmitted at a first transmitting instant (or in a first transmitting time slot) and a second partial data packet at a second transmitting instant (or in a second transmitting time slot), wherein the first transmitting instant and the second transmitting instant are different. Here, the time hopping pattern can define (or determine or indicate) the first transmitting instant and the second transmitting instant. Alternatively, the time hopping pattern can indicate the first transmitting instant and a time interval between the first transmitting instant and the second transmitting instant. Obviously, the time hopping pattern can also indicate only the time interval between the first instant and the second transmitting instant. Between the partial data packets, transmission pauses can exist where no transmission takes place. The partial data packets can also overlap in time (intersect each other).

A frequency hopping pattern can indicate a sequence of transmitting frequencies or transmitting frequency hops by which the partial data packets are transmitted. For example, a first partial data packet can be transmitted with a first transmitting frequency (or in a first frequency channel) and a second partial data packet with a second transmitting frequency (or in the second frequency channel), wherein the first transmitting frequency and the second transmitting frequency are different. Here, the frequency hopping pattern can define (or determine or indicate) the first transmitting frequency and the second transmitting frequency. Alternatively, the frequency hopping pattern can indicate the first transmitting frequency and a frequency spacing (transmitting frequency hop) between the first transmitting frequency and the second transmitting frequency. Obviously, the frequency hopping pattern can also indicate only the frequency spacing (transmitting frequency hop) between the first transmitting frequency and the second transmitting frequency.

Obviously, the plurality of partial data packets 142 can be transmitted both distributed in time and in frequency from the data transmitter 100 to the data receiver 110. The distribution of the plurality of partial data packets in time and frequency can take place according to a time frequency hopping pattern. A time frequency hopping pattern can be the combination of a time hopping pattern and a frequency hopping pattern, i.e. a sequence of transmitting instants or transmitting time intervals by which the partial data packets 142 are transmitted, wherein transmitting frequencies (or transmitting frequency hops) are allocated to the transmitting instants (or transmitting time intervals).

Figure 2:
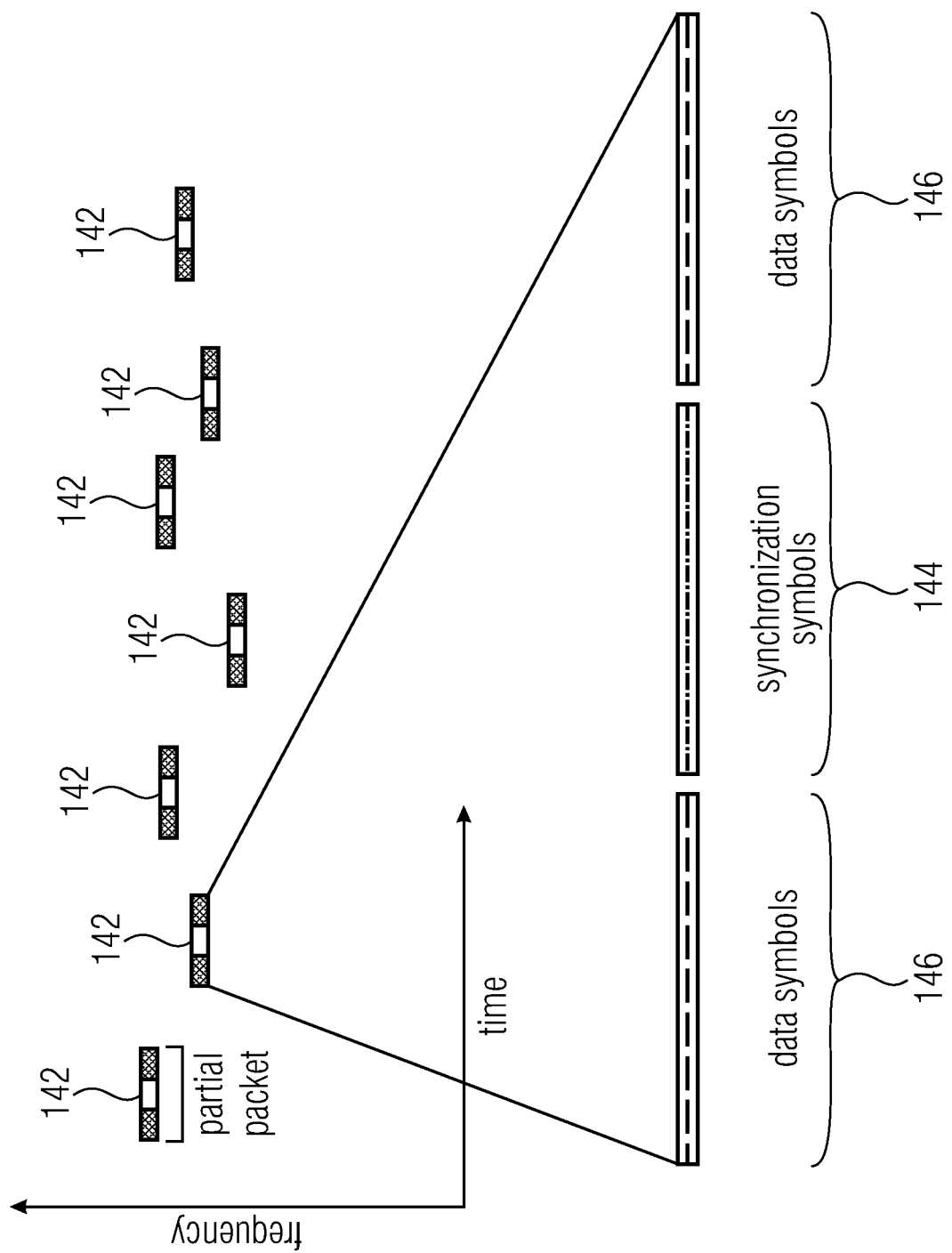
FIG. 2 shows, in a diagram, an occupancy of the transmission channel during transmission of a plurality of partial data packets according to a time hopping pattern.

FIG. 2 shows in a diagram an occupancy of the transmission channel during transmission of a plurality of partial data packets 142 according to a time frequency hopping pattern. Here, the ordinate describes the frequency and the abscissa the time.

As can be seen in FIG. 2, the data packet 120 can exemplarily be divided into n=7 partial data packets 142 and can be transmitted from the data transmitter 100 to the data receiver 110 distributed in time and frequency according to a time frequency hopping pattern.

As can further be seen in FIG. 2, apart from data (data symbols 146 in FIG. 2), the plurality of partial data packets 142 can also include pilot sequences (pilot symbols) (or synchronization symbols 144 in FIG. 2), based on which the data receiver 110 can detect the partial data packets 142 in a receiving signal 120 or receiving data stream. In some embodiments, detection could also be performed without using the pilot sequences, wherein this case occurs, e.g., in radio intelligence when the pilot sequences are not yet known.

During simultaneous or time overlapping emission of a plurality of data packets divided into partial data packets by a plurality of data transmitters, the computing power needed in the data receiver for detection and decoding of the partial data packets increases significantly.

For reducing the computing power needed for detection and decoding, in embodiments, detection and decoding of the partial data packets takes place separately, as will be discussed below.

2. EMBODIMENTS OF THE DATA RECEIVER (SYSTEM DESCRIPTION)

In the following, embodiments of the present invention will be described that relate to signal processing and data storage during detection and decoding of data packets in the data receiver 110 of a data transmission system.

Figure 3:
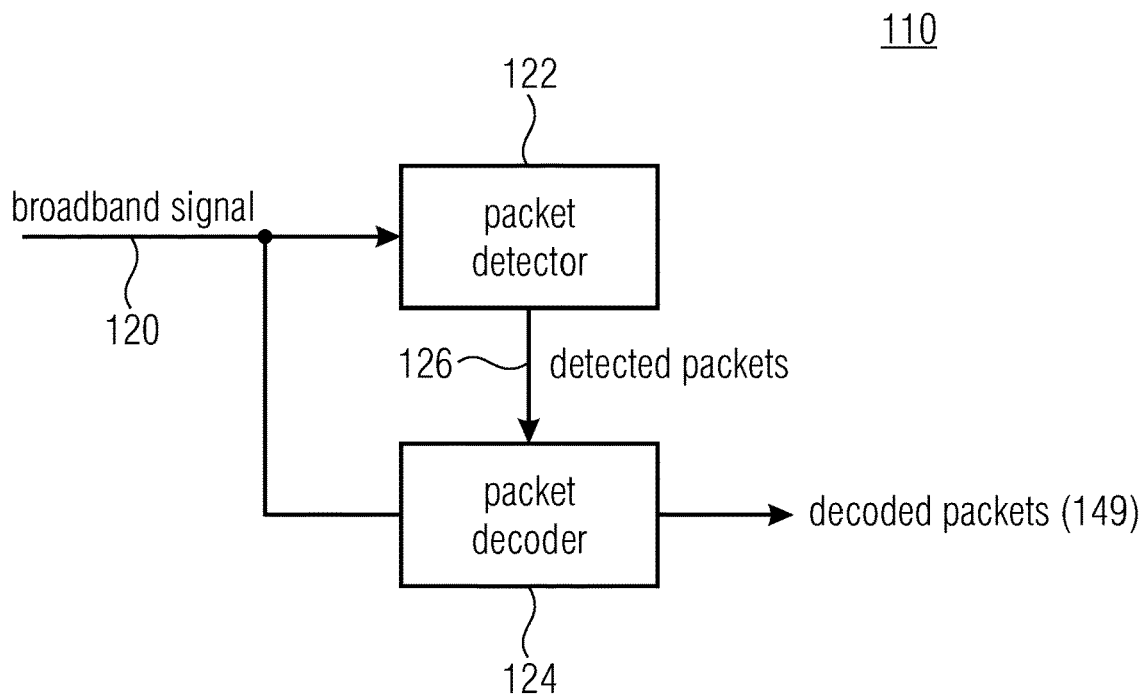
FIG. 3 is a schematic block diagram of a data receiver according to an embodiment of the present invention.

FIG. 3 shows a schematic block diagram of a data receiver 110 according to an embodiment of the present invention. The data receiver 110 is configured to receive a broadband signal 120, wherein the broadband signal 120 comprises at least two partial data packets 142 that are distributed across different frequencies (e.g. frequency channels) according to a hopping pattern 140.

The data receiver 110 can comprise a detector 122 that is configured to perform a detection of the at least two partial data packets 142 in the broadband signal 120 and to provide at least one detection parameter 126 (e.g. a detection instant and/or a detection frequency) for the detected partial data packets.

For example, the detector 122 can be configured to provide a detection parameter 126 (e.g. a detection instant and/or a detection frequency) for each of the detected partial data packets. Obviously, the detector 122 can also be configured to provide only one detection parameter (e.g. a (reference) detection instant and/or a (reference) detection frequency) for the hopping pattern 140 of the at least two partial data packets 142, wherein the receiving instants and/or receiving frequencies of the at least two partial data packets 142 are implicitly known by the definition of the hopping pattern (e.g. transmitting instants and/or transmitting frequencies).

The data receiver 110 can further comprise a decoder 124 that is configured to perform decoding of the detected partial data packets by using the at least one detection parameter 126, e.g., to obtain decoded packets 149.

The detector 122 and the decoder 124 can be configured separately, such that the detector 122 and the decoder 124 can perform or process the detection (of the at least two partial data packets 142 and the decoding (of the detected partial data packets) separately from one another. Thus, the data receiver 110 is configured to perform or process detection (of the at least two partial data packets 142) and decoding (of the detected partial data packets) separately from one another.

In embodiments, the detector 122 can be configured to perform the detection (of the partial data packets 142) continuously.

In embodiments, the decoder 124 can be configured to perform decoding in dependence on an available computing power of the data receiver 110.

For example, the decoder 124 can be configured to perform decoding of one of the detected partial data packets when sufficient computing power is available for decoding the respective detected partial data packet.

In other words, FIG. 3 shows the components, a packet detector 122 for detecting the packets in a broadband signal 120 and a packet decoder 124 for evaluating the detected packets. Here, the detected packets represent the detection instants where the packet has presumably arrived at the receiver 110.

As exemplarily shown in FIG. 3, the data receiver 110 can comprise a detector (packet detector) 122 and a decoder (packet decoder) 124. Obviously, the data receiver 110 can also be implemented by means of a processor, a microprocessor or another programmable logic circuit, wherein in this case the circuit blocks shown in FIG. 3 can, for example, be implemented by respective algorithms.

Figure 4:
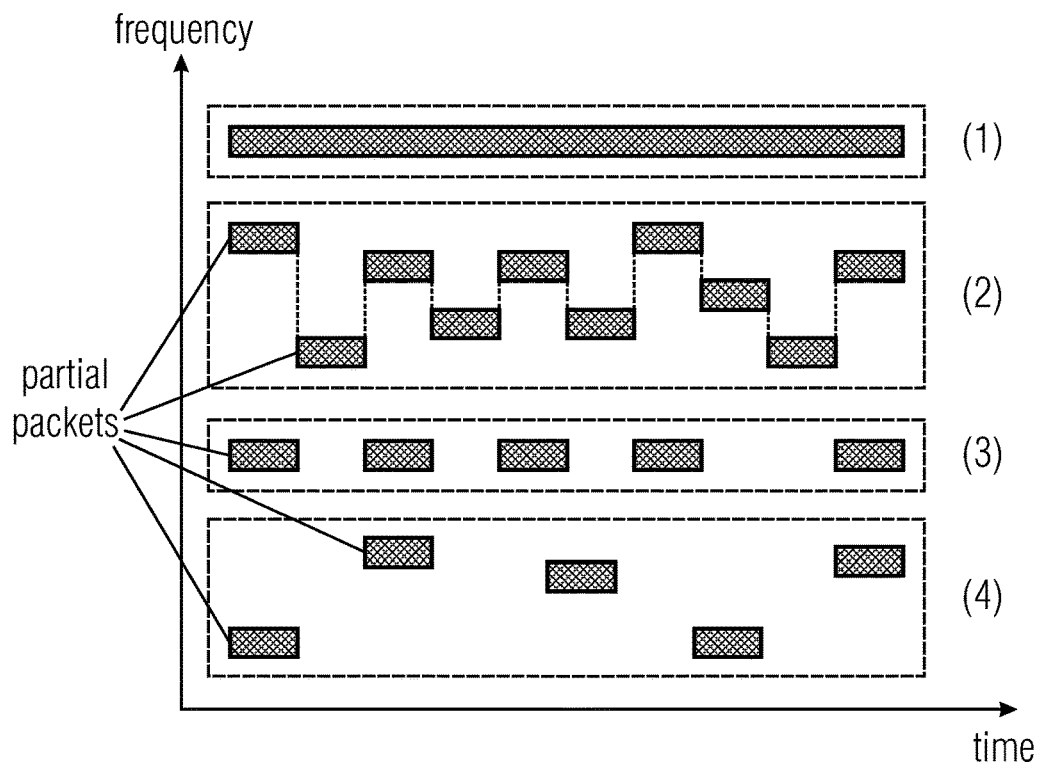
FIG. 4 shows, in a diagram, an occupancy of the transmission channel during transmission of data packets by using four different transmission methods.

FIG. 4 shows in a diagram an occupancy of the transmission channel when transmitting data packets by using one of four different transmission methods. Here, in FIG. 4, the ordinate describes the frequency and the abscissa the time. In other words, FIG. 4 shows four possible methods for transmitting an individual packet.

A first transmission method (case 1) includes continuous transmission of a data packet at constant frequency.

A second transmission method (case 2) includes continuous transmission of a data packet in connection with a frequency hopping method.

A third transmission method (case 3) includes discontinuous transmission of a data packet (telegram splitting) at constant frequency.

A fourth transmission method (case 4) includes discontinuous transmission of a data packet (telegram splitting) in connection with a frequency hopping method.

Embodiments of the data receiver 110 are relevant for all four methods when a plurality of packets is to be received that are emitted asynchronously by different transmitters at different frequencies, such that, at the input, the broadband signal 120 has a significantly higher bandwidth than the (partial) packets (in case 1 packets, in cases 2 to 4 partial packets). Embodiments of the data receiver 110 become particularly relevant in case 4 that allows a particularly high degree of parallel asynchronous packet transmissions.

Additionally, frequency generators having a relatively high tolerance are used in the transmitters 100 for cost reasons, so that a frequency offset occurs between transmitter 100 and receiver 110 in all four cases, which can be a multiple of the symbol rate $f_{sym}$ of the partial packets 142. Since this effect reduces the probability for packet collisions, the maximum throughput of the transmission system can be increased by specifically adding a stochastic component to the transmitting frequencies. Thereby, the transmitting frequencies are basically unknown in the receiver 110.

Detection and synchronization of the packets in the receiver 110 can be performed with the help of synchronization sequences (pilot sequences with synchronization symbols 144) in the (partial) packets. Normally, these sequences are arranged in the middle of the partial packets 142 (midamble). However, embodiments can be applied to all possible arrangements of the synchronization sequence (preamble, midamble, postamble).

2.1 Signal Processing in the Detector

Figure 5:
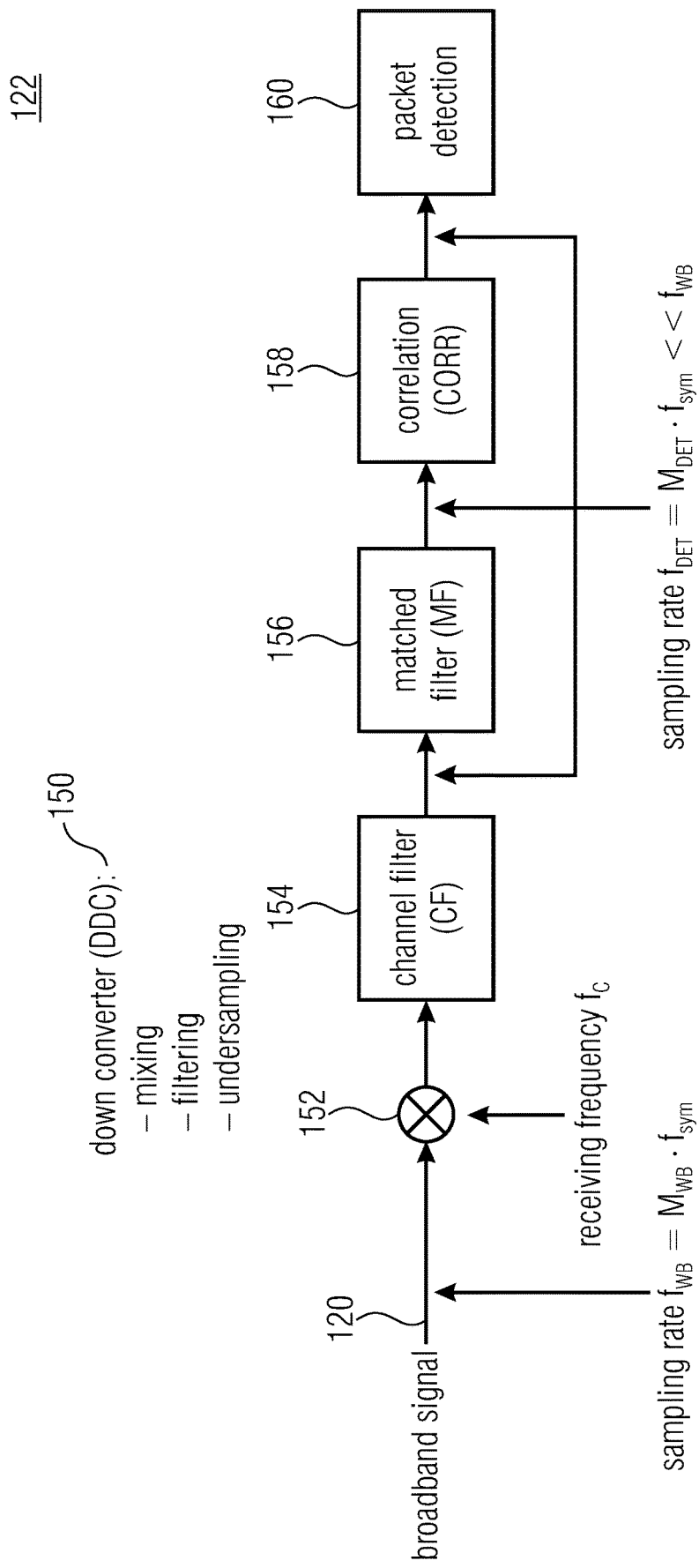
FIG. 5 is a schematic block diagram of a single-channel detector of a data receiver according to an embodiment.

FIG. 5 shows a schematic block diagram of a single-channel detector 122 according to an embodiment. The detector 122 can comprise a DDC 150 (digital down converter) that can be configured to mix and filter the broadband signal 150. For this, the DDC 150 can comprise, for example, a mixer 152 and a channel filter 154. Further, the detector 122 can comprise a matched filter 156, a correlator 158 and a packet detection 160.

In other words, FIG. 5 shows the signal processing in a single-channel detector 122 at known receiving frequency $f_C$. Here, the sampling rate of the signal in the DCC 150 is reduced from the sampling rate $f_{WB}$ of the broadband signal 120 to the sampling rate $f_{DET}$ of the subsequent components 156, 158. The channel filter (CF) 154 can act as anti-alias filter for undersampling and therefore, the same can comprise a sufficiently high stopband attenuation.

The DDC 150 is succeeded by a matched filter (MF) 156 for impulse filtering, multi-stage correlation (CORR) 158 for the synchronization sequences of the partial packets and their summary and the actual packet detection 160.

In the following, all sampling rates are additionally indicated in multiples of the symbol rate $f_{sym}$ of the partial packets 142. For the detector 122, the following applies:

$$f_{WB}=M_{WB} \cdot f_{sym} \text{ und } f_{DET}=M_{DET} \cdot f_{sym}$$

Values for $M_{DET}$ are, for example (e.g. typically) 2 and 4, i.e. the processing in the detector 122 can be performed, for example (e.g. normally) at the double or quadruple symbol rate. The value for $M_{WB}$ is normally (e.g. significantly) greater, i.e. the following applies:

$$f_{DET} << f_{WB} \text{ or } M_{DET} << M_{WB}$$

Due to the frequency offset between transmitter 100 and receiver 110, the detector 122 can be configured as multi-channel detector with N parallel receiving channels as will be discussed below based on FIG. 6.

Figure 6:
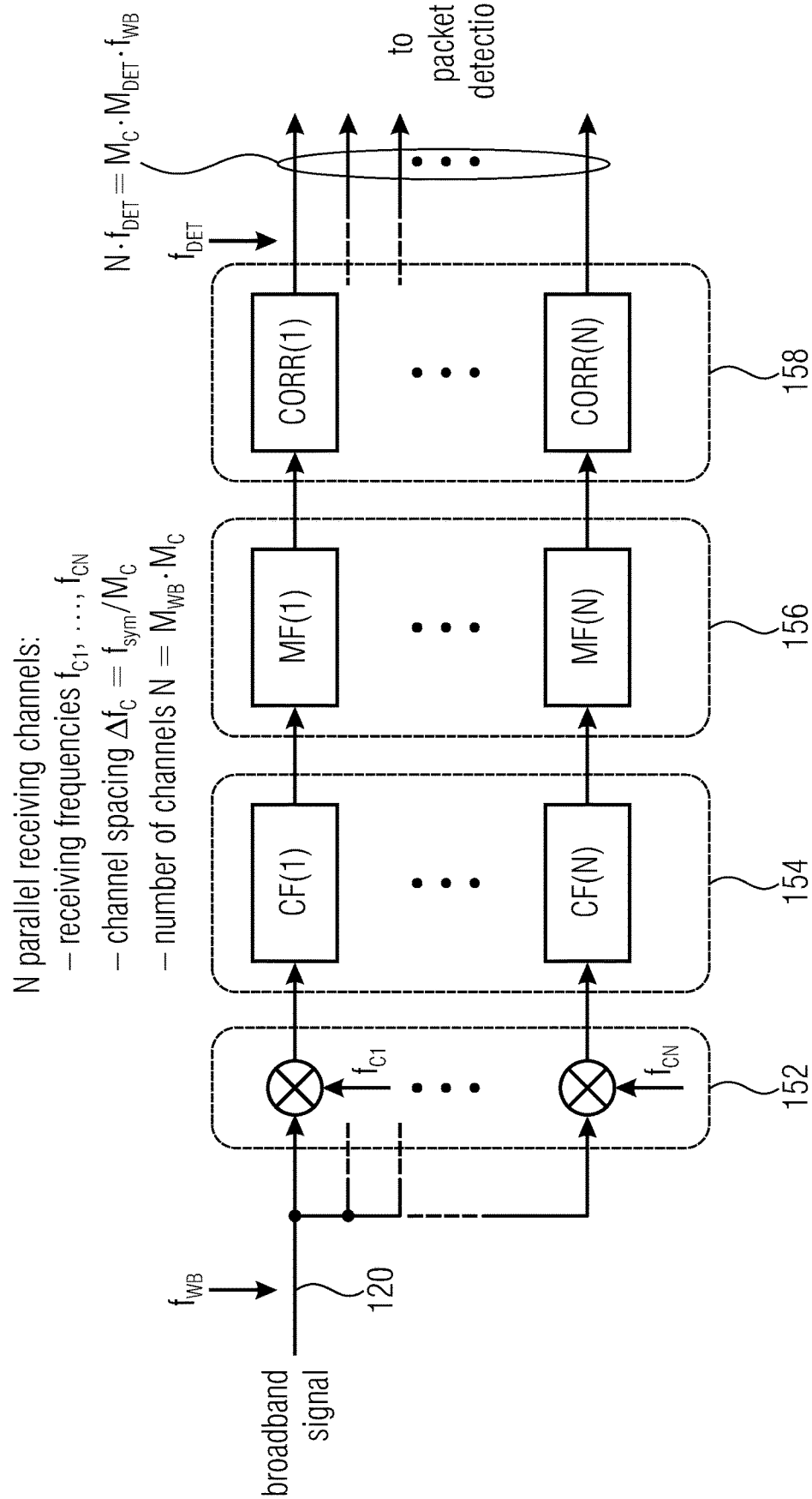
FIG. 6 is a schematic block diagram of a multi-channel detector of a data receiver according to an embodiment.

FIG. 6 shows a schematic block diagram of a multi-channel detector 122 according to an embodiment. In other words, FIG. 6 shows a multi-channel detector with N channels. As can be seen in FIG. 6, the multi-channel detector 122 can comprise a mixer 152, a channel filter 154, a matched filter 156 and a correlator 158, for each channel.

The allowable channel spacing $$\Delta f_C = f_{sym}/M_C$$

can depend on the used synchronization sequences and the type of correlation and can be, for example (e.g. normally) ¼ . . . ¹⁄₁₆ of the symbol rate $f_{sym}$;

$$M_C = 4 \ldots 16$$

Thereby, the data stream at the output of the matched filter 156 as well as at the output of the first stage of correlation can be by the factor $M_C \cdot M_{DET}$ greater than the data stream of the broadband signal 120 at the input. The number of channels is:

$$N = M_{WB} \cdot M_C$$

Figure 7:
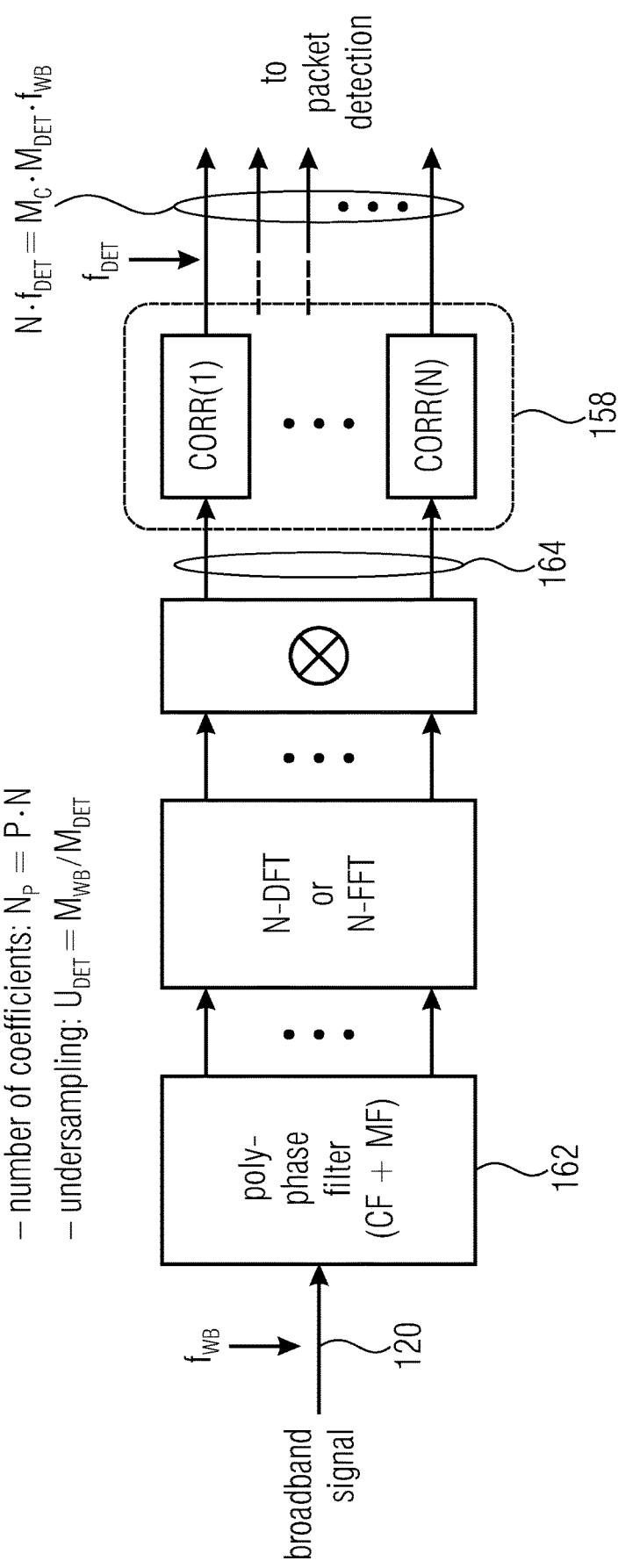
FIG. 7 is a schematic block diagram of a multi-channel detector of a data receiver according to an embodiment.

Realizing the mixer 152, the channel filter (CF) 154 and the matched filter (MF) 156 can be performed by a polyphase filterbank (CMFB), as shown in FIG. 7. Here, the filters CF 154 and MF 156 are combined to a polyphase filter (CF+MF).

In detail, FIG. 7 shows a schematic block diagram of the detector 122 according to an embodiment. The detector 122 includes a (first) filterbank 162 and the correlators 158, wherein the filterbank 162 can be configured to divide the broadband signal 120 in N subband signals 164 by polyphase filtering (and e.g. N point DFT or N point FFT). The correlators 158 can be configured to perform detection of the partial data packets 142 in the N subband signals 164, e.g. by correlation of the N subband signals 164 with a (known) synchronization sequence or synchronization sequences included in the partial data packets 142.

As can further be seen in FIG. 7, multi-channel filtering can take place with N point DFT or, if N is a power of two, with an N point FFT. The polyphase factor P indicates the ratio of the number $N_P$ of the filter coefficients and the number N of the channels and depends on the channel spacing, given by the factor $M_C$, and the needed stopband attenuation of the filter. Values are, for example (typically) in the range P=1 . . . 2. For P=1, a common filterbank with $N_P = N$ results.

Undersampling by the factor $$U_{DET} = f_{WB}/f_{DET} = M_{WB}/M_{DET}$$

can be realized by a respective step width in the broadband signal.

The signals of the individual channels can be converted into baseband signals (subband signals) by derotation without frequency offset.

The following table (Table 1) summarizes the parameters of the detector 122 and states examples for a system 1 with MWB=96 and the system 2 with MWB=1024. For both systems applies exemplarily $M_{DET}=2$ and MC=8.

| Indication of the Parameter | Parameter | Equation | System 1 | System 2 |
|---|---|---|---|---|
| Oversampling of the broadband signal | $M_{WB}$ | | 96 | 1024 |
| Oversampling in temporal direction | $M_{DET}$ | | 2 | 2 |
| Oversampling in frequency direction | $M_C$ | | 8 | 8 |
| Undersampling = step width | $U_{DET}$ | $M_{WB}/M_{DET}$ | 48 | 512 |
| No. of channels = length of DFT/FFT | N | $M_{WB} \cdot M_C$ | 768 | 8192 |
| Polyphase factor | P | | 1 | 1 |
| Number of coefficients of the filter | $N_P$ | $P \cdot N$ | 768 | 8192 |
| Increase of the data stream | $K_{DET}$ | $M_C \cdot M_{DET}$ | 16 | 16 |

Due to the typically high number of channels N, the needed computing effort is very high and depends only slightly on the number of detected packets.

2.2 Delay of the Broadband Signal

Processing in the package detector 122 has a delay that can be combined of the delay of the filters and the spacing between synchronization sequences of the first and the last partial packet 142. Therefore, the broadband signal 120 can be delayed by means of a signal ring buffer 170 before the same can be supplied to the packet decoder 124 as shown in FIG. 8.

Figure 8:
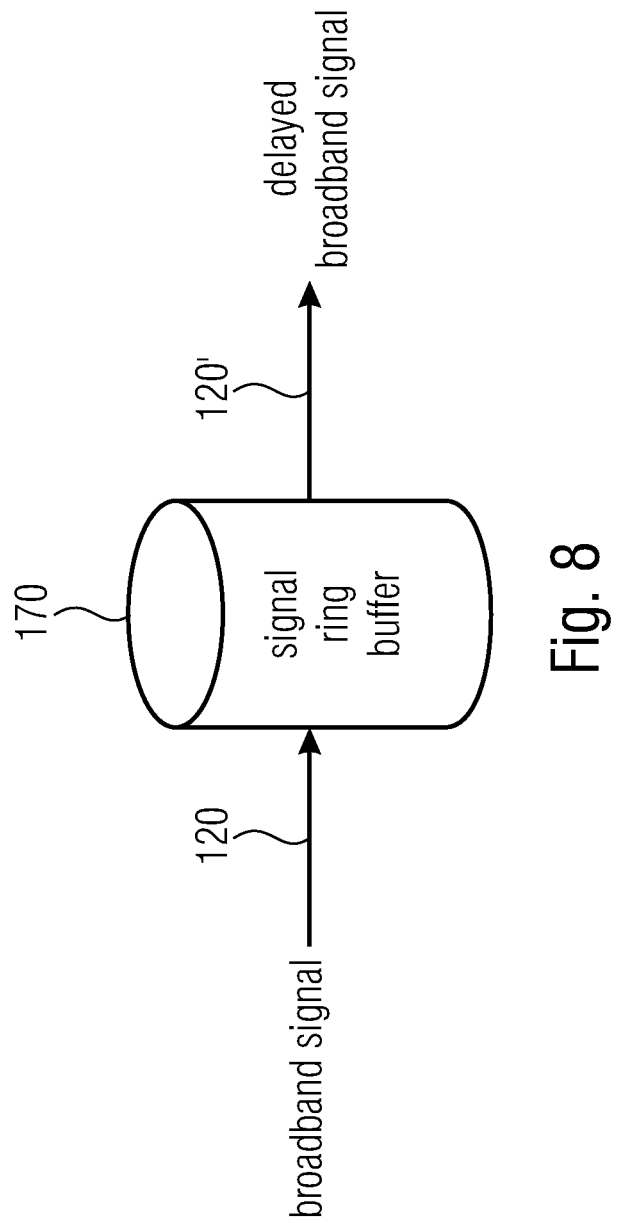
FIG. 8 is a schematic block diagram of a signal ring buffer of a data receiver according to an embodiment.

In detail FIG. 8 shows a schematic block diagram of a signal ring buffer 170 that is configured to cache the received broadband signal 120 to obtain a delayed broadband signal 120'. In other words, FIG. 8 shows a delay of the broadband signal 120.

In a software receiver 110 for a massive parallel reception, the delay can additionally include the time that can pass from the detection of a packet up to the actual processing of the packet.

2.3 Signal Processing in the Decoder

Figure 9:
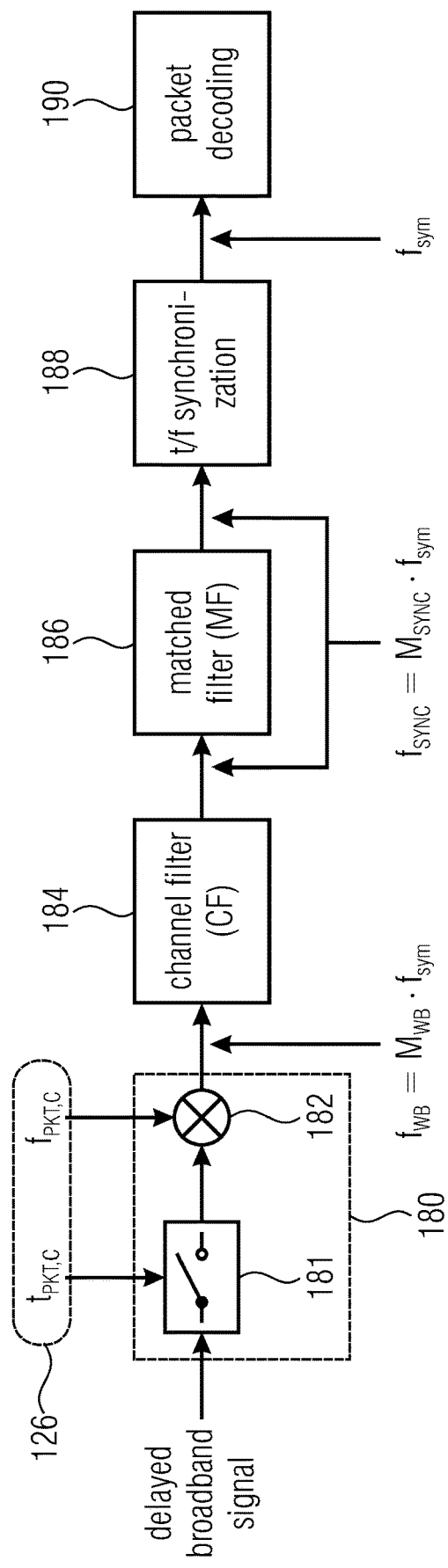
FIG. 9 is a schematic block diagram of a decoder of a data receiver according to an embodiment.

FIG. 9 shows a schematic block diagram of a decoder 124 according to an embodiment. The decoder 124 is configured to decode a detected partial data packet based on the detection parameter 126 (e.g. reference time instant (coarse) $t_{PKT,C}$ and frequency (coarse) $f_{PKT,C}$) provided by the detector 122.

The decoder 124 can comprise, for example, an extractor 180 that is configured to select a suitable signal portion (e.g. in frequency and temporal direction, symbolized by switch 181 and mixer 182), based on the detection parameter 126 (e.g. reference time instant (coarse) $t_{PKT,C}$ and frequency (coarse) $f_{PKT,C}$) provided by the detector 122. Further, the decoder 124 can comprise a mixer 182, a channel filter 184, a matched filter 186, a t/f synchronization 188 and a packet decoding 190.

As can be seen in FIG. 9, processing in the decoder can be performed based on the parameters (detection parameters 126) of a detected packet. Here, the reference time instant $t_{PKT,C}$ can correspond to the detection instant in the packet detector 120 with a temporal granularity $\Delta t_{PKT,C} = 1/f_{DET}$. The frequency $f_{PKT,C}$ can correspond to the center frequency of the detector channel where the packet has been detected. The granularity $\Delta f_{PKT,C}$ can correspond to the channel spacing $\Delta f_C$.

The switch 180 and the mixer 182 in FIG. 9 symbolize the selection of the signal portions of the partial packets 142 in temporal and frequency direction based on the parameters (detection parameters) 126. In the channel filter (CF) 184, undersampling to the sampling rate can be performed:

$$f_{SYNC} = M_{SYNC} \cdot f_{sym}$$

The allocated undersampling factor is:

$$U_{SYNC} = f_{WB}/f_{SYNC} = M_{WB}/M_{SYNC}$$

This results in a granularity $\Delta t_{PKT,F} = 1/f_{SYNC}$ for the subsequent t synchronization $t_{PKT,F}$. Values are, for example (e.g. typically) in the range $M_{SYNC} = 4 \ldots 16$.

In the decoder 124, the channel filter (CF) 184 and the matched filter (MF) 186 can also be combined to a single filter (CF+MF). Here, for example, the same filter can result as in the polyphase filterbank (CMFB) 162 of the detector 124 in FIG. 7. Filtering can take place as common polyphase filtering with undersampling by the factor $U_{SYNC}$. Alternatively, filtering can take place by means of fast convolution in the frequency domain. This is also a good option as the signal portion of the partial packets are frequently so short that fast convolution can take place in one block.

The f synchronization $f_{PKT,F}$ can take place by a respective rotation of the signal after the matched filter (MF) 186. For increased requirements by a higher-level modulation method in connection with a high granularity $\Delta f_{PKT,C}$, however, it may be needed to repeat mixing and filtering with the more accurate value $f_{PKT,F}$ in order to remove the symbol interference caused by the frequency offset $$\Delta f_{PKT} = f_{PKT,F} - f_{PKT,C}$$

After t/f synchronization has been performed, the symbols with the symbol rate $f_{sym}$ can be extracted and can be supplied to a packet decoding 190.

The following table (Table 2) summarizes exemplary parameters in the decoder 124.

| Indication of the Parameter | Parameter | Equation | System 1 | System 2 |
|---|---|---|---|---|
| Oversampling of the broadband signal | $M_{WB}$ | | 96 | 1024 |
| Oversampling in temporal direction | $M_{SYNC}$ | | 12 | 8 |
| Undersampling | $U_{SYNC}$ | $M_{WB}/M_{SYNC}$ | 8 | 128 |
| Number of coefficients (CF + MF) | $N_P$ | see det. | 768 | 8192 |

The processing shown in FIG. 9 is to be performed for each detected partial packet 142, i.e. the needed computing effort is proportional to the number of detected partial packets 142. For a massive parallel reception, the computing effort increases significantly and can exceed the computing effort in the detector 122.

2.4 Interaction of Packet Detector and Packet Decoder

Figure 10:
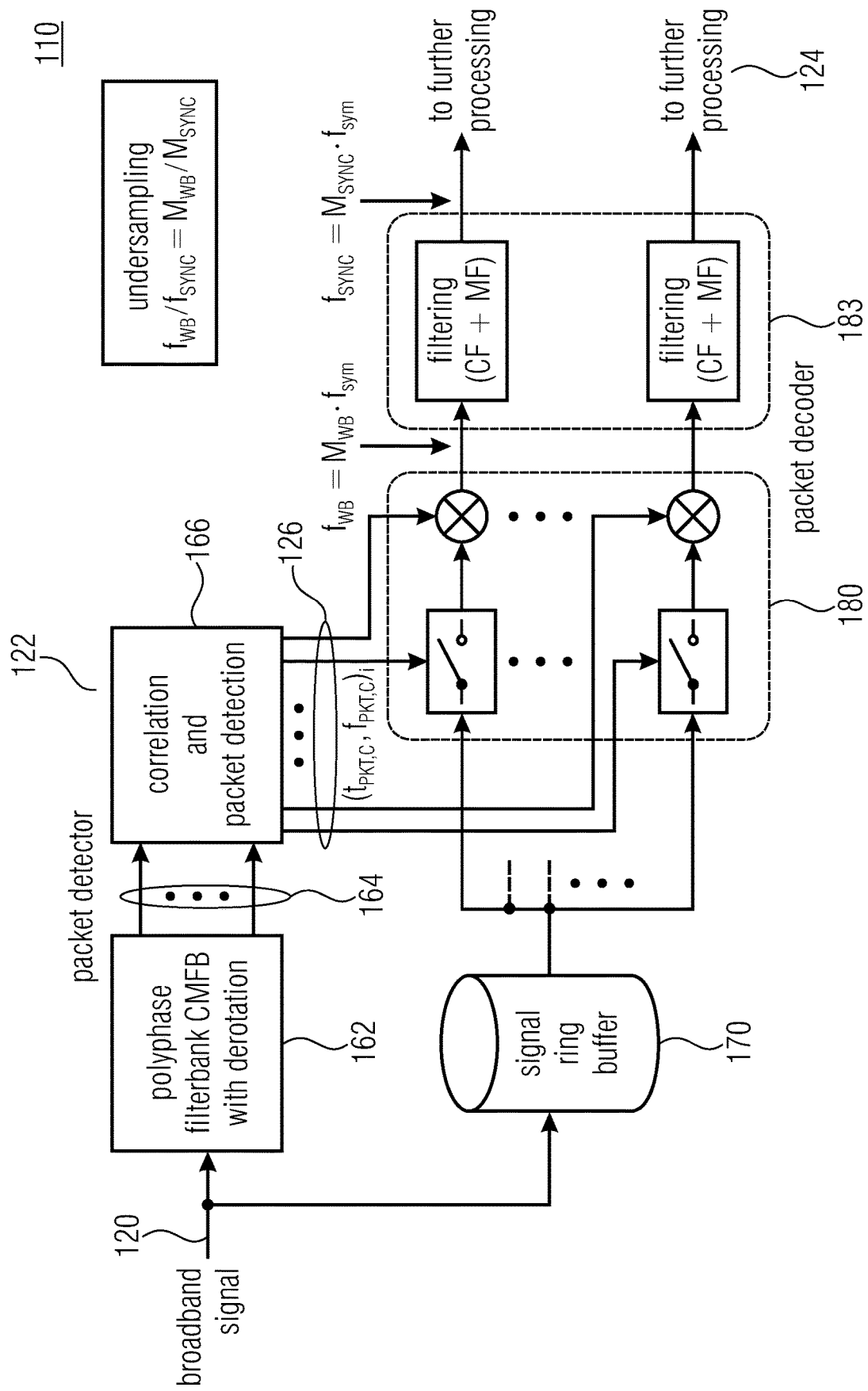
FIG. 10 is a schematic block diagram of a data receiver according to an embodiment.

FIG. 10 shows a schematic block diagram of a data receiver 110 according to an embodiment. The data receiver 110 includes a detector 122, a decoder 124 and a signal ring buffer 170.

The detector 122 can include a first filterbank 162 that can be configured to divide the broadband signal 120 into N subband signals 164 for the detection of the partial data packets 142, wherein the N subband signals can comprise different (e.g. partly overlapping) subbands of the broadband signal 120. The detector 122 can be configured to perform detection of the partial data packets 142 in the N subband signals 164, for example by correlation of the N subband signals 164 with a (known) synchronization sequence or synchronization sequences included in the partial data packets 142 to provide detection parameters 126 (e.g. detection time instants and/or detection frequencies) for the detected partial data packets 142.

For example, the detector 122 can comprise a correlation and packet detection 166 that can be configured to perform the correlation and packet detection. For this, the correlation and packet detection 166 can comprise, e.g. the correlators 158 shown in FIG. 7.

The signal ring buffer 170 can be configured to cache the received broadband signal 120 to provide a delayed broadband signal 120'.

The decoder 124 can be configured to extract the detected data packets 142 from the received broadband signal 120 (or the delayed version of the received broadband signal 120') by using the detection parameters 126.

For this, the decoder 124 can comprise, for example, a plurality of the extractors 180 and filtering 183 (e.g. channel filter 184 and matched filter 186) shown in FIG. 9. Here, a number of channels of the decoder 124 can correspond to a number N of channels of the detector 122. Obviously, the decoder 124 can also comprise more or less channels than the detector 122.

For a small number of detected packets, the embodiment of the data receiver 110 shown in FIG. 9 can be used without any problems. Since here the signal portions with the partial packets 142 are extracted from the broadband signal 120, this involves a high computing effort due to the high undersampling $U_{SYNC}$, which can become problematic under certain circumstances with massive parallel reception.

Figure 11:
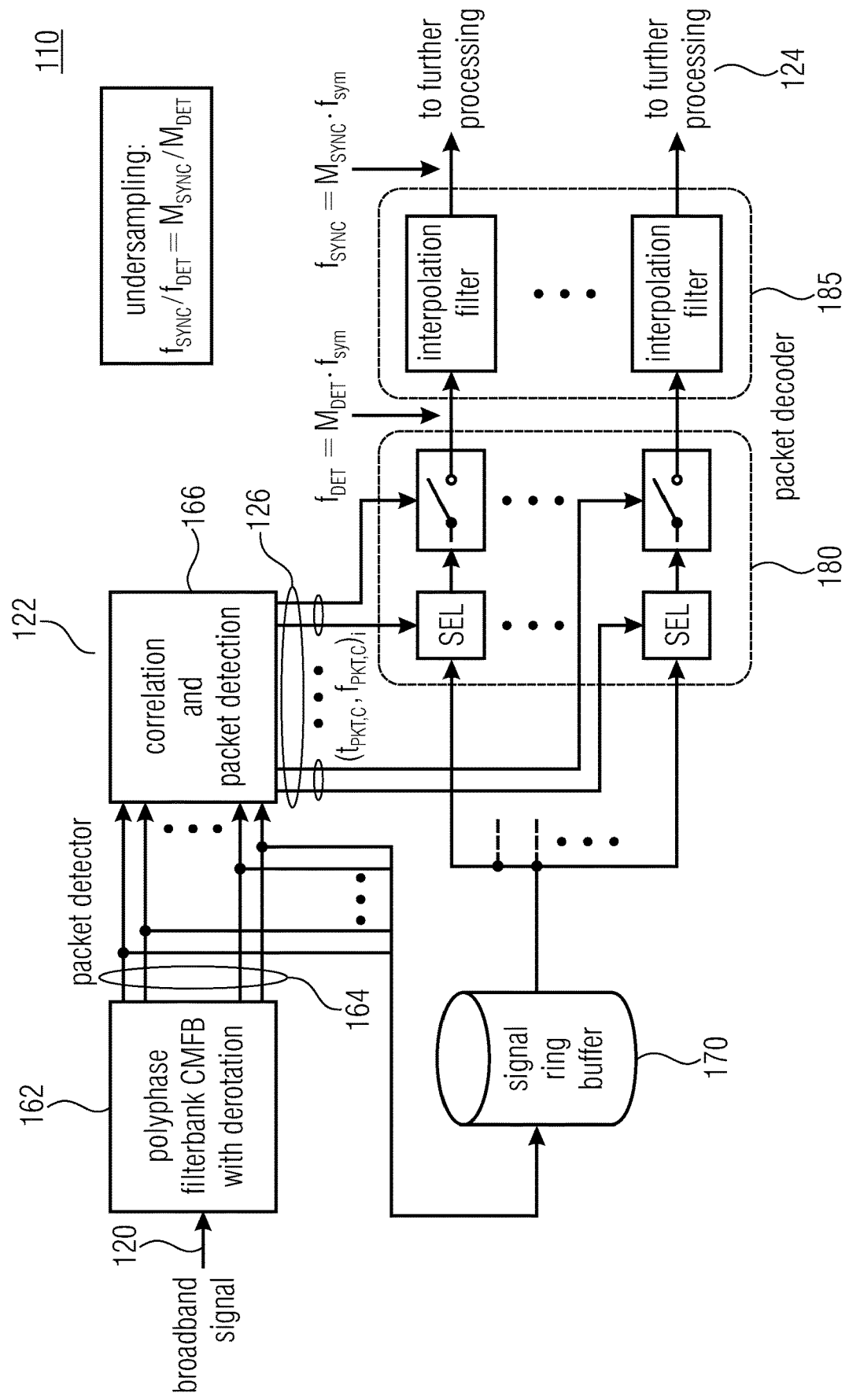
FIG. 11 is a schematic block diagram of a data receiver according to a further embodiment.

The embodiment of a data receiver 110 shown in FIG. 11, wherein the subband signals 164 from the packet detector 122 are also used in the packet decoder 124, can provide a remedy.

In detail, FIG. 11 shows a schematic block diagram of a data receiver 110 according to a further embodiment. The data receiver 110 includes a detector 122, a decoder 124 and a signal ring buffer 170.

The detector 122 can comprise a first filterbank 162 that can be configured to divide the broadband signal 120 into N subband signals 164 for detecting the partial data packets 142, wherein the N subband signals 164 comprise different (e.g. partly overlapping) subbands of the broadband signal 120. The detector 122 can be configured to perform the detection of the partial data packets 142 in the N subband signals 164, for example by correlation of the N subband signals 164 with a (known) synchronization sequence or synchronization sequences included in the partial data packets 142 to provide detection parameters 126 (e.g. detection time instants and/or detection frequencies) for the detected partial data packets 142.

For example, the detector 122 can comprise a correlation and packet detection 166 that can be configured to perform the correlation and packet detection. For this, the correlation and packet detection 166 can comprise, for example the correlators 158 shown in FIG. 7.

The signal ring buffer 170 can be configured to cache the N subband signals 164 provided by the first filterbank 162 of the detector 122.

The decoder 124 can be configured to extract the detected partial data packets 142 from the respective subband signals 164 cached in the signal ring buffer 170 by using the detection parameters 126 (e.g. detection time instants and/or detection frequencies), for example by filtering (e.g. channel filter and/or matched filter) and (fine) time and/or frequency synchronization.

For this, the decoder 124 can comprise, for example, a plurality of extractors 180 and interpolation filters 185. Here, a number of channels of the decoder 124 can correspond to a number N of channels of the detector 122. Obviously, the decoder 124 can also comprise more or less channels than the detector 122.

In FIG. 11, the selectors (SEL) and the switches symbolize the extraction of the signal portions of the partial packets from the respective subband signals 164 of the packet detector 122. Mixing is not needed due to the derotation of the signals in the polyphase filterbank 162 of the packet detector 122.

In this arrangement, oversampling (interpolation) by the factor $$f_{SYNC}/f_{DET}=M_{SYNC}/M_{DET}$$

can be performed. The involved computing effort is significantly lower, since selective filtering is already performed by the polyphase filter in the packet detector 122 and therefore simple interpolation in the frequency domain can be used. Thereby, the involved computing effort for massive parallel reception is significantly reduced compared to the embodiment of the data receiver 110 shown in FIG. 10.

However, the embodiment of the data receiver 110 shown in FIG. 11 also has a disadvantage under certain circumstances, which can be that the data stream of the detector signals (subband signals 164) is by the factor $K_{DET}$ stated in Table 1 greater than the data stream of the broadband signal 120. Thereby, the needed size of the signal ring buffer 170 also increases by the factor $K_{DET}$. Values for $K_{DET}$ are, for example, (e.g. typically) in the range 8 ... 16. For broadband signals 120 with a high bandwidth, the data stream of the broadband signal already assumes high values. In these cases, a further significant increase is problematic or even impossible. As one example, the values of the system 2 with $M_{WB}=1024$ and a symbol rate $f_{sym}=2$ kBaud are stated. In this case, the sampling rate $f_{WB}$ of the broadband signal 120 is 2048 ksps. If it is assumed that discontinuous emission of the partial packets 142 of a packet takes approximately 5 seconds and the complex-valued broadband signal is in the floating point format with 8 bytes per complex sampling value, the data stream of the broadband signal is 60 Mbyte/s and the memory size of a signal ring buffer for the broadband signal is 80 Mbyte. This results in a memory size of 1280 Mbytes for the detector signals, with $K_{DET}=16$ for a signal ring buffer. By using other data formats, the memory size can be reduced but the factor $K_{DET}$ between the two variations is approximately maintained.

The subsequent table (Table 3) summarizes the characteristics of the two embodiments of the data receiver 110 of FIG. 10 and FIG. 11.

| Arrangement | Computing Effort | Memory Requirements |
| --- | --- | --- |
| FIG. 10 | high | low |
| FIG. 11 | low | high |

2.5 Usage of Pre-Fragmentation of the Broadband Signal

Figure 12:
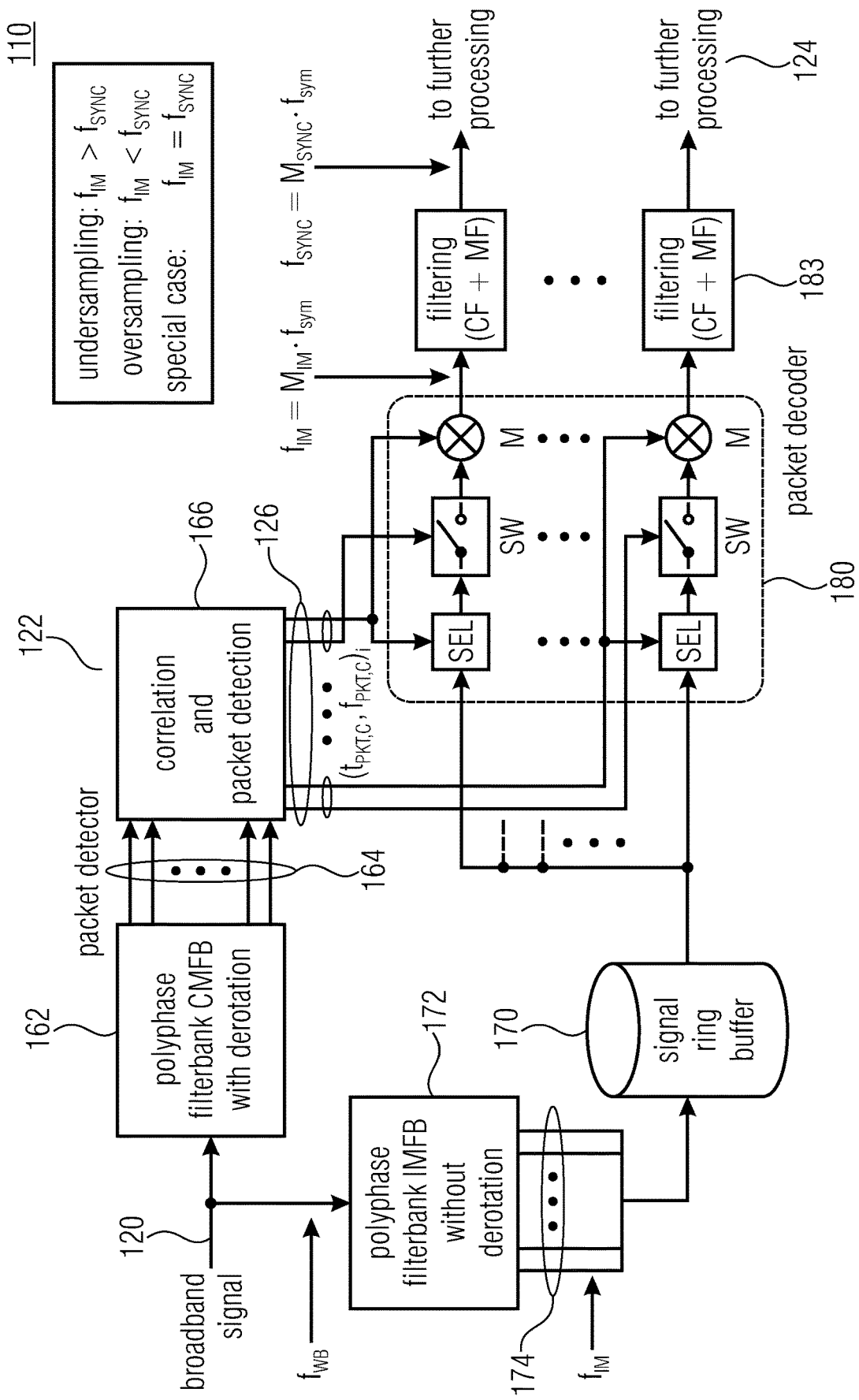
FIG. 12 is a schematic block diagram of a data receiver according to a further embodiment.

FIG. 12 shows a schematic block diagram of a data receiver 110 according to a further embodiment. The data receiver 110 includes a detector 122, a decoder 124, a second filterbank 172 and a signal ring buffer 170.

The detector 122 can include a first filterbank 162 that can be configured to divide the broadband signal 120 into N subband signals 164 for detecting the partial data packets 142, wherein the N subband signals comprise different (e.g. partly overlapping) subbands of the broadband signal 120. The detector 122 can be configured to perform detection of the partial data packets 142 in the N subband signals 164, for example by correlation of the N subband signals 164 with a (known) synchronization sequence or synchronization sequences included in the partial data packets 142 to provide detection parameters 126 (e.g. detection time instants and/or detection frequencies) for the detected partial data packets 142.

For example, the detector 122 can comprise a correlation and packet detection 166 that can be configured to perform correlation and packet detection. For this, the correlation and packet detection 166 can comprise, for example the correlators 158 shown in FIG. 7.

The second filterbank 172 can be configured to divide the broadband signal 120 into $N_{IM}$ subband signals 174 for decoding the detected partial data packets 142, wherein the $N_{IM}$ subband signals 174 comprise different (e.g. partly overlapping) subbands of the broadband signal 120.

Here, a number $N_{IM}$ of subband signals of the subband signals 174 provided by the second filterbank 172 for decoding the detected partial data packets 142 can be lower than a number N of subband signals of the subband signals 164 provided by the first filterbank 162 of the detector 122 for detecting the at least two partial data packets 142.

The signal ring buffer 170 can be configured to cache the $N_{IM}$ subband signals 174 provided by the second filterbank 172.

The decoder 124 can be configured to extract the detected partial data packet from the respective subband signals 174 cached in the signal ring buffer 170 by using the detection parameters 126 (e.g. detection time instants and/or detection frequencies), for example by filtering (e.g. channel filter and/or matched filter) and (fine) time and frequency synchronization.

For example, the decoder 124 can be configured to select a suitable subband signal of the $N_{IM}$ subband signals 174 for decoding the detected partial data packets and to extract the detected partial data packets 142 from the respective subband signals. For example, the decoder 124 can select suitable (time) portions of suitable subband signals for decoding the respective detected partial data packets by using the respective detection parameters (e.g. detection time instants and/or detection frequencies) and extract the respective detected partial data packets from the selected subband signals, for example by filtering (e.g. channel filter and/or matched filter) and (fine) time and frequency synchronization.

For this, the decoder 124 can comprise, for example, a plurality of extractors 180 and filters (e.g. channel filter and/or matched filter) 183.

The embodiment of the data receiver 110 shown in FIG. 12 is based on a pre-fragmentation of the broadband signal 120. Thereby, a tradeoff between the computing effort with a massive parallel reception and the memory requirements can be found.

Figure 13:
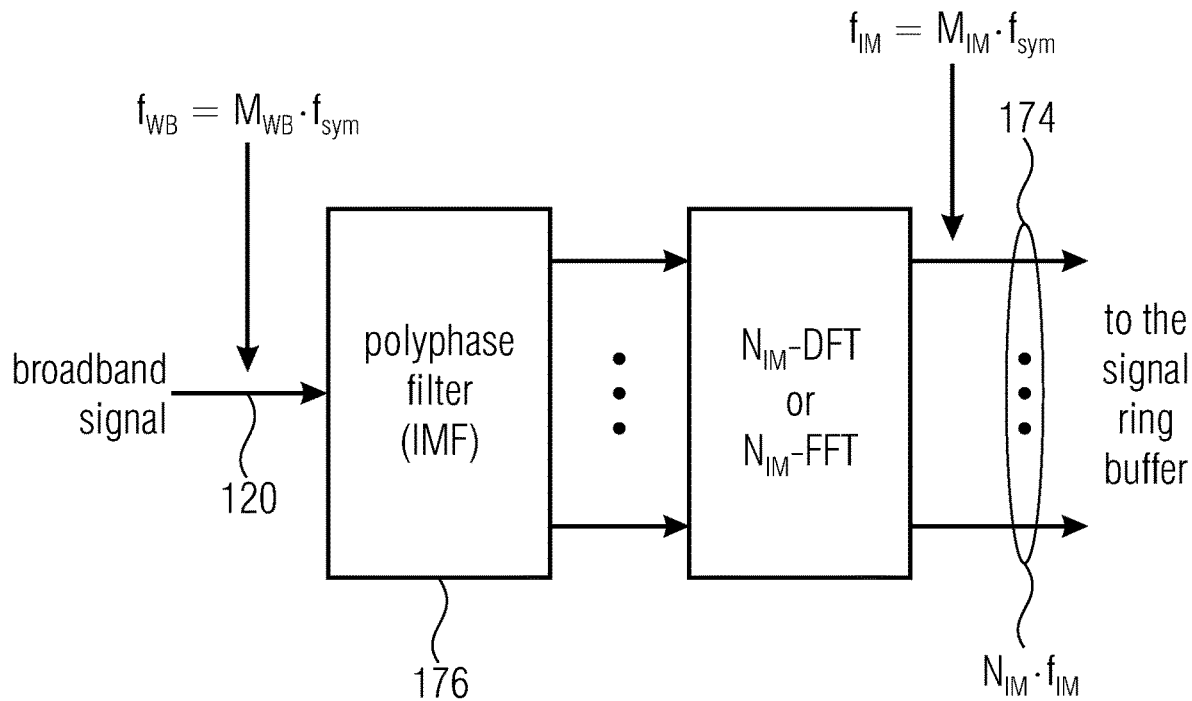
FIG. 13 is a schematic block diagram of a filterbank of a decoder of a data receiver according to an embodiment.

The broadband signal 120 can be pre-fragmented into overlapping subbands with an additional polyphase filterbank (IMFB) 172, as shown in FIG. 13.

In detail, FIG. 13 shows a schematic block diagram of the second filterbank 172 according to an embodiment. As can be seen in FIG. 13, the second filterbank 172 can be configured to divide the broadband signal 120 into the plurality of subband signals 174 by polyphase filtering and N point DFT or N point FFT.

Here, the sampling rate can be reduced to the pre-fragmentation rate $f_{IM}$. The allocated undersampling factor is:

$$U_{IM}=f_{WB}/f_{IM}=M_{WB}/M_{IM}$$

With reference to the sampling rate $f_{SYNC}$ in the decoder 124, three cases are to be distinguished:

1. $f_{IM}>f_{SYNC}$: undersampling in the filtering (CF+MF) 183 needed
2. $f_{IM}<f_{SYNC}$: oversampling in the filtering (CF+MF) 183 needed
3. $f_{IM}=f_{SYNC}$: no change of sampling rate needed Regarding the computing effort during pre-fragmentation, case 1 is most favorable and case 2 most unfavorable. Regarding the computing effort in the package decoder 124, it is exactly the other way around. Concerning the memory requirements, there is no preference, since the number $N_{IM}$ of channels has to be increased when reducing the sampling rate $f_{IM}$.

In pre-fragmentation, the data stream also increases since the sum of the bandwidth of the subbands during (e.g. needed) overlapping is greater than the bandwidth of the broadband signal 120. The factor of increase is:

$$K_{IM} = N_{IM} \cdot f_{IM} / f_{WB} = N_{IM} \cdot M_{IM} / M_{WB}$$

However, in practice, this factor assumes at most the value 2, i.e. the sum data stream of the subband signals 174 amounts to a maximum of twice the data stream of the broadband signal 120.

Figure 14:
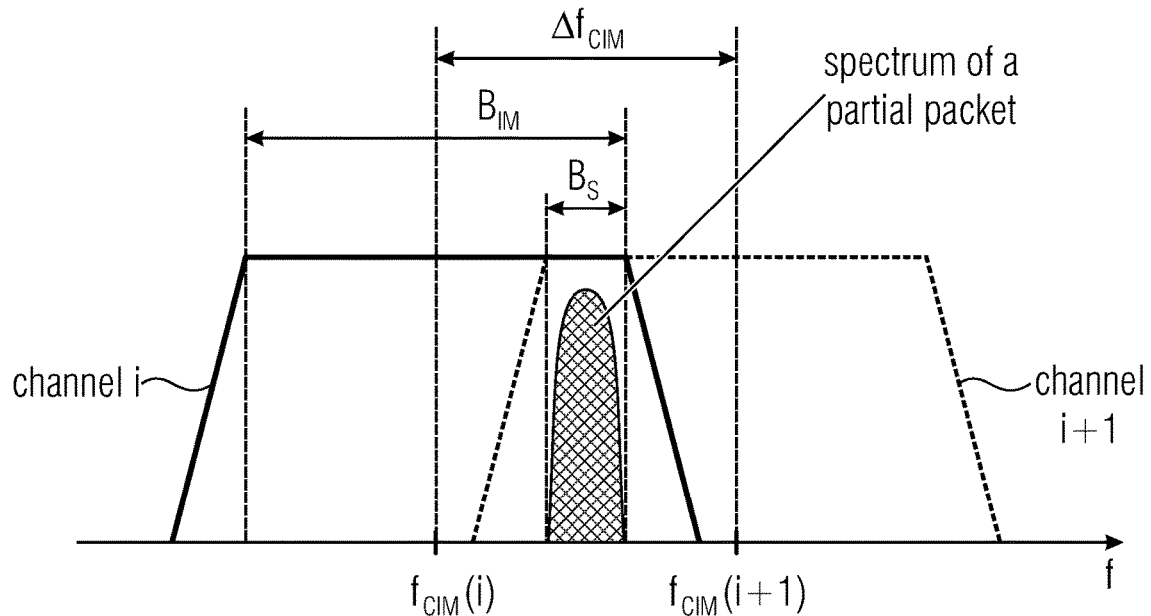
FIG. 14 shows, in a diagram, passbands of adjacent filter channels of the filterbank shown in FIG. 13 according to an embodiment.
Figure 15:
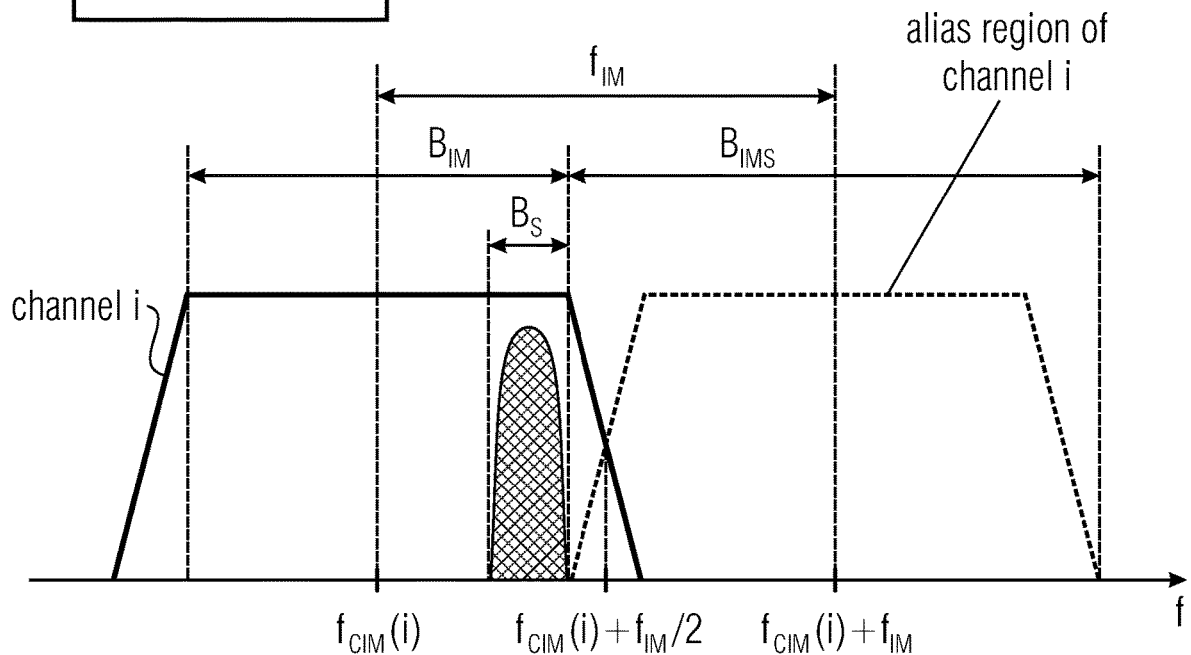
FIG. 15 shows, in a diagram, a passband and a stop bandwidth of a filter channel of the filterbank shown in FIG. 13 according to an embodiment.

The polyphase filter (IMF) of the polyphase filterbank (IMFB) 172 can fulfill two conditions:
- The passbands of adjacent filter channels can overlap at least by the bandwidth $B_S$ of a partial packet 142, so that a partial packet 142 in this area can be extracted either from the one or the other filter channel without significant distortions, see FIG. 14. In the filter design, the available margin can be fully utilized $B_S = B_{IM} - \Delta f_{CIM}$.
- The sum of the bandwidth $B_{IM}$ of the passband and the stop bandwidth $B_{IMS}$ cannot exceed the value $2 \cdot f_{IM}$ so that the overlapping area remains free from alias products, see FIG. 15. Here, the available margin in the filter design can also be fully utilized: $B_{IM} + B_{IMS} = 2 \cdot f_{IM}$.

The following relationships can apply:
Bandwidth of a partial packet: $B_S = b_S \cdot f_{sym}$ with $b_S = 1 \ldots 2$
Bandwidth of the passband region: $B_{IM} = b_{IM} \cdot f_{IM}$ with $b_{IM} < 1$
Channel spacing: $\Delta f_{CIM} = f_{WB}/N_{IM}$
With $f_{IM} = M_{IM} \cdot f_{sym}$ and $f_{WB} = M_{WB} \cdot f_{sym}$, the following condition results:

$$N_{IM} > M_{WB}/(M_{IM} - b_S)$$

The values for $b_S$ and $M_{WB}$ are predetermined. From the value pairs $(M_{IM}, N_{IM})$ fulfilling the condition, the value pair for which the computing effort becomes minimum during massive parallel reception with the maximum packet rate to be expected is selected. Therefore, for each value pair $(M_{IM}, N_{IM})$, the allocated polyphase filter (IMF) can be designed with a normalized bandwidth $$B_{IM}/f_{WB} = b_S/M_{WB} + 1/N_{IM}$$

of the passband region and the normalized stop bandwidth $$B_{IMS}/f_{WB} = (2 \cdot M_{IM} - b_S)/M_{WB} - 1/N_{IM}.$$

The coefficient number $N_{PIM}$ needed for obtaining a sufficiently high stop attenuation is normally significantly greater than the number of channels $N_{IM}$. The needed polyphase factor $$P_{IM} = N_{PIM}/N_{IM}$$

is, for example (e.g. normally) in the range 6 ... 10.

For the system 1 considered as an example, $M_{WB} = 96$ and $M_{SYNC} = 12$ applies. For the bandwidth of the partial packets, $b_S = 2$ applies. The following condition results:

$$N_{IM} > 96/(M_{IM} - 2)$$

To obtain case 3, where no change of the sampling rate is needed in the decoder 124, $M_{IM} = M_{SYNC} = 12$ has to apply, From this, the following results for the number of channels: $N_{IM} > 9.6$. Accordingly, theoretically, a DFT having the length $N_{IM} = 10$ could be used. Here, however, the factor $b_{IM}$ is very close to one, so that the polyphase filter (IMF) has to have a very high number of coefficients. In this case, a good tradeoff is obtained with an FFT of the length $N_{IM} = 16$. In this case, the following values are obtained for the normalized bandwidth of the filter:

$$B_{IM}/f_{WB} = 2/96 + 1/16 = 0.0833$$

$$B_{IMS}/f_{WB} = (2 \cdot 12 - 2)/96 - 1/16 = 0.1667$$

A respective filter design with a stopband attenuation over 80 dB results in a filter with $N_{PIM} = 96$ coefficients. The polyphase factor is $P_{IM} = 6$. The data stream increases by the factor $$K_{IM} = N_{IM} \cdot M_{IM}/M_{WB} = 16 \cdot 12/96 = 2$$

Regarding the computing effort in the decoder, a lower value for $M_{IM}$ would be desirable, e.g. $M_{IM} = 6$. This needs $N_{IM} > 24$. In this case, an FFT having the length $N_{IM} = 32$ would be favorable. Whether this can result in a reduction of the overall needed computing effort for the maximum to be expected packet rate will have to be determined experimentally.

Generally, it applies that the optimum value for $M_{IM}$ decreases with increasing packet rate. Here, the term $-b_S$ in the denominator of the above-stated condition has the effect that the number $N_{IM}$ of channels increases strongly when $M_{IM}$ approximates $b_S$. In this region, the data stream also increases further. The arrangements in FIG. 10 and FIG. 11 are to be considered as limiting cases:
- The embodiment of the data receiver 110 shown in FIG. 10 is optimum for very low packet rates. In this case, the additional computing effort for pre-fragmentation cannot be compensated by a reduced computing effort in the packet decoder 124.
- The embodiment of the data receiver 110 shown in FIG. 11 is optimum for very high packet rates regarding the computing effort. The same corresponds to the limiting case of a maximum pre-fragmentation where the subbands of the pre-fragmentation each form a receiving channel and the three involved filters, the filter in the pre-fragmentation (IMF), the channel (CF) and the matched filter (MF) are combined to one filter. However, the data stream increases considerably.

Extracting the signal portions of the partial packets 124 from the subbands can take place in four steps, see FIG. 12:
1. Determining the subband where the signal portion lies (SEL)
2. Extracting the signal portion from the signal of the subband (SW)
3. Mixing the signal portion to frequency position zero (M)
4. Fast convolution of the signal portion with the filter (CF+MF).

Normally, fast convolution can take place in one block due to the shortness of the signal portions. The same includes the following three steps:
1. Transformation of the signal portion by means of FFT in the frequency domain
2. Multiplication with the frequency domain representation of the filter (CF+MF)
3. Retransformation into the time domain by means of IFFT.

In cases with $f_{IM} \neq f_{SYNC}$ or $M_{IM} \neq M_{SYNC}$, the needed undersampling or oversampling takes place by shortening or extending (zero stuffing) the transformed portion in the frequency domain. In that case, the IFFT is shorter or longer than the FFT.

3. FURTHER EMBODIMENTS

3.1 Separate Processing of Detector and Decoder

Generally, in a receiver, the detector determines the needed computing power of the system. If a telegram is detected in the detector, the same has to be processed further in order to extract the (presumably) transmitted data. For the system to process the "additional" detections, an estimation has to be made how many telegrams arrive approximately at the base station on average. These telegrams have to be incorporated in the calculation of the needed computing power.

Typically, these detections are processed directly after the detection in the same process. This offers the advantage that the data needed for processing do not have to be cached. For massive parallel reception of telegrams, this approach cannot be implemented, since the computing power of the detector is no longer sufficient due to the additional processing of the telegrams.

A solution for this is the separate processing of detector and decoder (see FIG. 3). In a successful detection, the detector 120 transmits the detection parameters 126 to the decoder 124 that takes care for the subsequent processing. Thereby, the computing power of the detector 102 remains (almost) constant and is easier to estimate.

In systems having several computing kernels (CPU), the decoder 124 can be processed on one/several further kernels or on different processors. Calculating the computing power of the decoder 124 is performed analogously to a system with combined detector/decoder.

Further, it is also possible to operate the detector 122 and the decoder 124 on different signal processing units connected to one another via a data interface (e.g. detector in FPGA, decoder in DSP or GPP).

Optionally, an individual decoder process can be started for each detected telegram. This process waits until the data needed for decoding are available. Also, after receiving part of the data, a first decoding test can already be initiated and if the same is successful, it can be terminated again. Thus, the further data do not have to be decoded. If the test is not successful, the decoder can wait for further data and start a further decoding test later.

Another advantage of this type of processing is the option of parallel processing of the individual detections. In that way, a short telegram, which had been detected later, can be processed earlier than a telegram needing further data. For this, the maximum memory length of the system can be reduced, since the latency of the system is minimized.

A further advantage of this method is that, if the number of detected telegrams is too large (for a short term), individual detected telegrams can be discarded quite easily without having to stop the detector. Thereby, the subsequent telegrams are not affected by the (short-term) overload. The selection which detected telegrams are discarded can be made with the help of an overflow buffer or based on the detection parameters (time instant, frequency offset, SNR).

In embodiments, the detector 122 and the decoder 124 can run in different modules. In multi-core systems, the detector 122 can run in a different thread than the decoder 124, in multi-processor systems on another processor. Only the detection parameters 126 are exchanged between detector 122 and decoder 124.

In embodiments, the detection time instants can be stored in a "database" by the packet detector 122 and retrieved from this database by the packet decoder 124 to perform decoding. During (short-term) overload of the system, individual detected telegrams cannot be processed immediately, the same are taken one after the other from the database for processing.

3.1.1 Data Storage between Detector and Decoder
3.1.1.1 Signal Ring Buffer for the Broadband Signal According to chapter 2.4, a signal ring buffer 170 is used, which caches the broadband signal 120 directly, i.e. without division into subbands. In a detected telegram, the decoder 124 accesses the broadband signal directly and extracts the needed telegram.

Regarding storage, this approach is the best solution, since the ring buffer 170 only stores the data volume of the broadband signal 120. Contrary to that, by dividing the broadband signal into subbands, the data volume increases.

In embodiments, the data storage 170 between detector 122 and decoder 124 can include the broadband signal 120 without any specific further processing.

In embodiments, the decoder 124 can extract the symbols from the broadband signal 120 by means of a DDC (digital down converter).

3.1.1.2 Signal Ring Buffer for Subband Signals

Instead of storing the broadband signal 120, the subband signals 164 of the filterbank 162 can also be stored as in chapter 2.4. This has the advantage that the decoder 124 can process the subband signals 164 directly and therefore no DDC is needed anymore. Thereby, the computing effort for the DDC is omitted. A disadvantage are the increased memory requirements due to the higher data volume.

If the oversampling factor $M_{SYNC}$ in the decoder 124 is higher than the oversampling factor $M_{DET}$ in the detector 122, oversampling by the factor $M_{SYNC}/M_{DET}$ can be performed prior to the decoder 124, e.g. by an interpolator.

Instead of storing the subband signals 164 of the detector 122 completely, only every second, third, fourth subband signal can be stored in the data storage 170. For example, the frequency spacing between two adjacent subbands can be determined by the allowable error in the correlator of the detector. For processing in the decoder, a lower frequency spacing might be sufficient so that not all subbands are needed in the decoder, but only every second, third, etc.

Optionally, this can also take place in temporal direction, such that only every second, third, fourth sampling value of the relevant subband signals is stored. Thereby, the memory requirements are reduced. The sampling rate $F_{DET}$ in the detector can also be determined by the allowable error in the correlator. The case can occur that $F_{DET}$ is so high that a reduced sampling rate is sufficient for transmission to the decoder.

In embodiments, the data storage 170 between detector 122 and decoder 124 can include signals that are extracted from the detection filterbank 162.

In embodiments, the only every second, third, fourth subband signal and/or only every second, third, fourth sampling value of the subband signals may be stored in the signal ring buffer to reduce memory requirements.

In embodiments, the decoder 124 can extract the symbols or part of the symbols (only every second, third, . . . line of the SFT) from the filterbank for decoding like the detector.

In embodiments, the subband signals can be the output signals of the DFT/FFT of the filterbank.

3.1.1.3 Separate Filterbanks for Decoder and Detector

This approach is exemplarily described in chapter 2.5. The same represents the optimum of needed computing power and memory requirements.

The system is characterized by:
- a first polyphase filterbank (CMFB) 162 or other band fragmentation for providing the subband signals 164 for the packet detector 122,
- a second polyphase filterbank (IMFC) 172 or other band fragmentation for pre-fragmentation of the input signal into subband signals 174 for minimizing the computing effort in the packet decoder 124,
- optionally, filtering the signal portions of the partial packets 142 by means of fast convolution in a block including possibly needed undersampling or oversampling.

In embodiments, the decoder can extract the needed signal portion from the allocated subband signal with the help of the detection parameters.

3.1.2 Synchronization with Separate Processing of Detector and Decoder

Typically, detector and decoder perform processing one after the other.

The detector takes on the task of detecting the telegrams and the decoder the task of synchronizing the telegrams.

This results in the limitation that only one telegram can be detected in parallel. In systems having relatively high frequency offsets compared to the data rate (e.g. by quartz tolerances or systematic offsets), however, it is possible that telegrams are transmitted in parallel on several frequencies.

For this parallel detection to take place, the detection can examine several frequency hypotheses.

3.1.2.2 Synchronization in the Detector

Examining several frequency hypotheses and selecting the ones above the threshold corresponds to a frequency synchronization. Similarly, detection in temporal direction corresponds to a time synchronization.

Typically, oversamplings in temporal and frequency direction in the detector 122 are lower than the ones in the subsequent decoder 124. The same can be increased for the combined detection and synchronization and/or interpolation can be performed with the help of the neighboring channels/neighboring time instants in order to increase the resolution of the synchronization.

In embodiments, the detector can be extended by the ability of synchronization.

In embodiments, when the detection has taken place, first, the frequency and the time offset can be determined before the telegram is transmitted to the decoder.

3.1.2.2 Two-Stage Synchronization in the Detector and Decoder

The method described in the previous chapter has the disadvantage that normally a finer resolution of detection in frequency and temporal direction is needed and therefore more computing power is needed in the detector.

For preventing this problem and for still being able to perform parallel detection on several frequencies, a two-part synchronization can be used as shown in FIG. 9.

Here, detection is performed with the needed resolutions in temporal and frequency direction (coarse synchronization $t_{PKT,C}/f_{PKT,C}$). If detection takes place, the time instant and the frequency are transmitted to the decoder 124 with the selected resolution. The same uses these two parameters and performs synchronization only within the remaining accuracies (fine synchronization $t_{PKT,F}/f_{PKT,F}$).

A further advantage of this method is that the decoder 124 has to test less free time and frequency hypotheses due to the coarse synchronization and, hence, the needed computing power is lower.

In embodiments, the detector 122 can provide a coarse time and frequency offset (detection parameter) to the decoder 124.

In embodiments, the decoder 124 can calculate the fine synchronization based on the accuracy of the coarse synchronization of the detector 122. The coarse frequency offset $f_{PKT,C}$ obtained during synchronization in the detector 122 is compensated prior to fine synchronization.

3.1.3 Different Filters for the Detector and Decoder Filterbank

By using two separate filterbanks or when directly storing the broadband signal in the ring buffer, there is the option of using different filter characteristics.

Thus, instead of the matched filter (MF), approximation can be used during detection, which has an improved stopband attenuation and, hence, improves the selection of the individual transmissions in multi-channel reception.

In the decoder 124, it can be advantageous to use a filter characteristic improving the synchronization characteristics (in MFK e.g. RC or RRC filters instead of the MF).

In embodiments, different filter characteristics improving the functionality of the detector/decoder can be used in the filters or filterbanks.

In embodiments, a filterbank IMFB can be used which uses an FFT or a DFT.

In embodiments, other methods for fragmenting the broadband signal into subbands can be used, such as methods using no FFT or DFT.

4. FURTHER EMBODIMENTS

Figure 16:
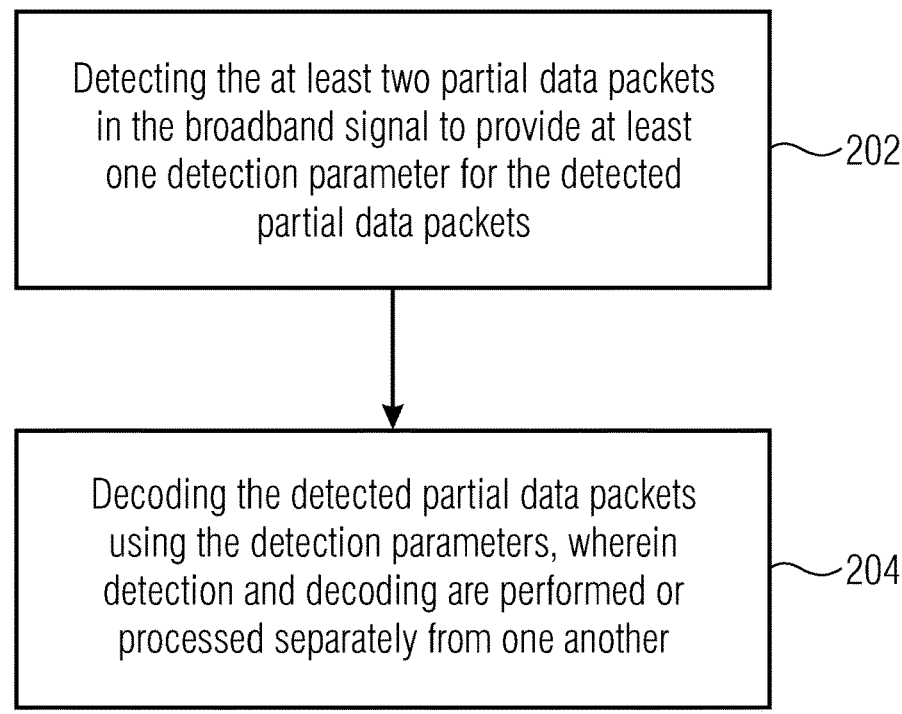
FIG. 16 is a flow diagram of a method for receiving a broadband signal according to an embodiment.

FIG. 16 shows a flow diagram of a method 200 for receiving a broadband signal, wherein the broadband signal comprises at least two partial data packets that are distributed across different frequencies [e.g. frequency channels]. The method 200 includes a step 202 of detecting the at least two partial data packets in the broadband signal to provide at least one detection parameter for the detected partial data packets. Further, the method 200 includes a step 204 of decoding the detected partial data packets using the detection parameters, wherein detection and decoding can be performed and processed separately from one another.

Figure 17:
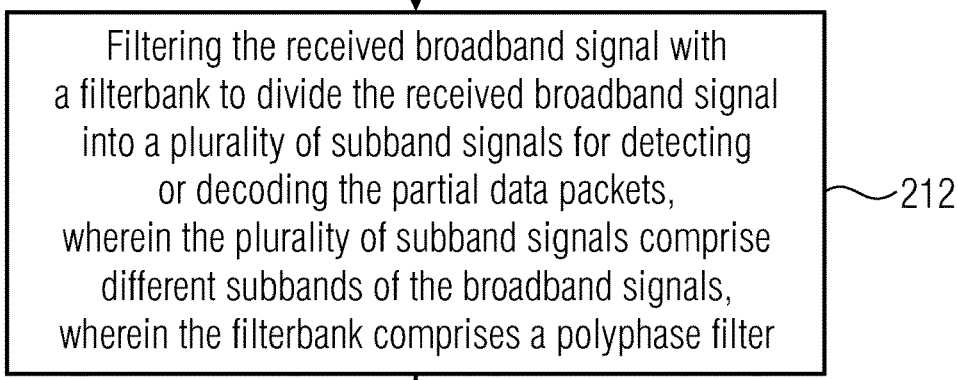
FIG. 17 is a flow diagram of a method for receiving a broadband signal according to a further embodiment.

FIG. 17 shows a flow diagram of a method 210 for receiving a broadband signal, wherein the broadband signal comprises at least two partial data packets that are distributed across different frequencies [e.g. frequency channels]. The method 210 includes a step 212 of filtering the received broadband signal with a filterbank to divide the received broadband signal into a plurality of subband signals for an [e.g. subsequent] detection or decoding of the partial data packets, wherein the plurality of subband signals comprise different [e.g. partly overlapping] subbands of the broadband signal, wherein the filterbank comprises a polyphase filter.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

The apparatuses described herein may be implemented, for example, by using a hardware apparatus or by using a computer or by using a combination of a hardware apparatus and a computer.

The apparatuses described herein or any components of the apparatuses described herein may be implemented at least partly in hardware and/or software (computer program).

The methods described herein may be implemented, for example, by using a hardware apparatus or by using a computer or by using a combination of a hardware apparatus and a computer.

The methods described herein or any components of the methods described herein may be performed at least partly by hardware and/or by software (computer program).

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Data receiver,
wherein the data receiver is configured to receive a broadband signal, wherein the broadband signal comprises at least two partial data packets that are distributed in time and/or frequency,
wherein the data receiver is configured to perform detection of the at least two partial data packets in the broadband signal and to provide at least one detection parameter for the detected partial data packets,
wherein the data receiver is configured to perform decoding of the detected partial data packets by using the at least one detection parameter,
wherein the data receiver is configured to perform or process the detection and the decoding separately from one another,
wherein the at least two partial data packets comprise pilot sequences,
wherein the data receiver is configured to detect the at least two partial data packets in the broadband signal based on the pilot sequences,
wherein the data receiver is configured to perform the decoding in dependence on available computing power of the data receiver, and
wherein the data receiver is configured to perform the decoding of one of the detected partial data packets when sufficient computing power is available.

2. Data receiver according to claim 1,
wherein the data receiver is configured to perform the detection continuously.

3. Data receiver according to claim 1,
wherein the data receiver is configured to perform or process the detection and the decoding in different processes.

4. Data receiver according to claim 1,
wherein the data receiver is configured to perform or process the detection and the decoding on different processors of the data receiver or on different processor kernels or threads of a processor of the data receiver.

5. Data receiver according to claim 1,
wherein the data receiver comprises separate signal processors connected to one another via a data interface,
wherein the data receiver is configured to perform or process the detection and the decoding on different signal processors.

6. Data receiver according to claim 1,
wherein the at least two partial data packets comprise a first plurality of partial data packets and a second plurality of partial data packets,
wherein the first plurality of partial data packets comprise first data that are transmitted divided into the first plurality partial data packets distributed on several frequency channels and at different time instants,
wherein the second plurality of partial data packets comprise second data that are transmitted divided into the second plurality of partial data packets distributed on several frequency channels and at different time instants,
wherein the data receiver is configured to perform decoding of detected partial data packets of the first plurality of partial data packets and decoding of detected partial data packets of the second plurality of partial data packets in parallel.

7. Data receiver according to claim 6,
wherein the first plurality of partial data packets and the second plurality of partial data packets have been transmitted by the same data transmitter,
or wherein the first plurality of partial data packets and the second plurality of partial data packets have been transmitted by different data transmitters.

8. Data receiver according to claim 6,
wherein the data receiver is configured to start decoding of the detected partial data packets of the first plurality of partial data packets or the second plurality of partial data packets independent of the other decoding, when all partial data packets of the respective plurality of partial data packets had been detected or when, by considering an encoding introducing transmitter-side redundancy, sufficient partial data packets of the respective plurality of partial data packets had been detected for a probably successful decoding.

9. Data receiver according to claim 1,
wherein the data receiver is configured to cache the received broadband signal or a further processed version of the broadband signal for decoding.

10. Data receiver according to claim 9,
wherein the further processed version of the broadband signal is a version of the broadband signal divided into a plurality of subband signals.

11. Data receiver according to claim 9,
wherein the data receiver is configured to cache a version of the broadband signal or the further processed version of the broadband signal undersampled in time and/or frequency with respect to a sampling rate of the broadband signal.

12. Data receiver according to claim 11,
wherein the data receiver is configured to cache the received broadband signal,
wherein the data receiver is configured to perform undersampling U.

13. Data receiver according to claim 1,
wherein the data receiver is configured to divide the broadband signal into a plurality of subband signals for detecting the plurality of partial data packets, wherein the plurality of subband signals comprise different subbands of the broadband signal,
wherein the data receiver is configured to perform detection of the at least two partial data packets in the different subbands of the plurality of subband signals.

14. Data receiver according to claim 13,
wherein the data receiver is configured to divide the broadband signal into the plurality of subband signals by polyphase filtering or polyphase filterbank.

15. Data receiver according to claim 13,
wherein the data receiver is configured to perform undersampling $U_{DET}$ when dividing the broadband signal into the plurality of subband signals.

16. Data receiver according to claim 13,
wherein the at least two partial data packets comprise a first plurality of partial data packets,
wherein the first plurality of partial data packets comprise first data that are transmitted divided into the first plurality of partial data packets distributed on several frequency channels and at different time instants,
wherein the data receiver is further configured to determine a frequency and/or time offset of the detected partial data packets of the first data, wherein the detection parameters further comprise the determined frequency and/or time offset.

17. Data receiver according to claim 9,
wherein the plurality of subband signals into which the broadband signal is divided is the further processed version of the broadband signal that is cached for decoding,
wherein the data receiver is configured to extract the detected partial data packets from the respective cached subband signals by using the detection parameters.

18. Data receiver according to claim 17,
wherein the data receiver is configured to perform oversampling M of the plurality of cached subband signals.

19. Data receiver according to claim 1,
wherein the data receiver is configured to divide the broadband signal into a plurality of subband signals for decoding the detected partial data packets, wherein the plurality of subband signals comprise different subbands of the broadband signal,
wherein the data receiver is configured to extract the detected partial data packets from the respective subband signals by using the detection parameters.

20. Data receiver according to claim 19,
wherein the data receiver is configured to select a suitable subband signal of the plurality of subband signals each for decoding the detected partial data packets and to extract the detected partial data packets from the respective subband signals.

21. Data receiver according to claim 19,
wherein the data receiver is configured to divide the broadband signal into the plurality of subband signals by polyphase filtering or polyphase filterbank.

22. Data receiver according to claim 19,
wherein the data receiver is configured to perform undersampling $U_{IM}$ when dividing the broadband signal into the plurality of subband signals.

23. Data receiver according to claim 19,
wherein the data receiver is configured to divide the broadband signal into a plurality of subband signals with overlapping subbands, wherein the subbands overlap by at least one bandwidth of one of the partial data packets.

24. Data receiver according to claim 19,
wherein the data receiver is configured to divide the broadband signal into a plurality of subband signals with overlapping subbands, wherein, when dividing the broadband signal, a sum of a bandwidth of a passband for one of the subband signals and of a stop bandwidth of a subband signal adjacent to the subband signal is not greater than twice the sampling rate $f_{IM}$ of the plurality of subband signals.

25. Data receiver according to claim 19,
wherein the data receiver is configured to perform resampling U of the plurality of subband signals.

26. Data receiver according to claim 25,
wherein resampling is undersampling U.

27. Data receiver according to claim 13,
wherein the sampling rate $f_{IM}$ of the plurality of subband signals for decoding the detected partial data packets is greater than a sampling rate $f_{DET}$ of the plurality of subband signals for detecting the at least two partial data packets.

28. Data receiver according to claim 13,
wherein a number of subband signals $N_{IM}$ of the subband signals for decoding the detected partial data packets is lower than a number of subband signals N of the subband signals for detecting the at least two partial data packets.

29. Data receiver according to claim 13,
wherein the data receiver is configured to divide the received broadband signal by means of different filter characteristics into the plurality of subband signals for detecting the at least two partial data packets and the plurality of subband signals for decoding the detected partial data packets.

30. Data receiver according to claim 29,
wherein the different filters comprise different frequency responses.

31. Data receiver according to claim 1,
wherein a bandwidth of the broadband signal is at least so large that the at least two partial data packets can also be received by the data receiver at a maximum allowable frequency offset between data transmitter and data receiver.

32. Method for receiving a broadband signal, wherein the broadband signal comprises at least two partial data packets that are distributed across different frequencies, wherein the method comprises:
detecting the at least two partial data packets in the broadband signal to provide at least one detection parameter for the detected partial data packets,
decoding the detected partial data packets by using the detection parameters,
wherein the detection and the decoding are performed or processed separately from one another,
wherein the at least two partial data packets comprise pilot sequences,
wherein the at least two partial data packets in the broadband signal are detected based on the pilot sequences,
wherein the decoding is performed in dependence on available computing power, and
wherein decoding of one of the detected partial data packets is performed when sufficient computing power is available.

33. A non-transitory digital storage medium having a computer program stored thereon to perform the method for receiving a broadband signal, wherein the broadband signal comprises at least two partial data packets that are distributed across different frequencies, wherein the method comprises:
detecting the at least two partial data packets in the broadband signal to provide at least one detection parameter for the detected partial data packets,
decoding the detected partial data packets by using the detection parameters,
wherein the detection and the decoding are performed or processed separately from one another,
wherein the at least two partial data packets comprise pilot sequences,
wherein the at least two partial data packets in the broadband signal are detected based on the pilot sequences,
wherein the decoding is performed in dependence on available computing power,
wherein decoding of one of the detected partial data packets is performed when sufficient computing power is available, and
when said computer program is run by a computer.

34. Data receiver,
wherein the data receiver is configured to receive a broadband signal, wherein the broadband signal comprises at least two partial data packets that are distributed in time and/or frequency,
wherein the data receiver comprises a first filterbank that is configured to divide the received broadband signal into a plurality of subband signals for detecting the partial data packets, wherein the plurality of subband signals comprise different subbands of the broadband signal,
wherein the filterbank comprises a polyphase filter;
wherein the data receiver comprises a detector that is configured to detect the at least two partial data packets in the different subbands of the plurality of subband signals of the first filterbank to provide detection parameters for the detected partial data packets,
wherein the data receiver comprises a second filterbank that is configured to divide the received broadband signal into a plurality of subband signals for decoding the partial data packets, wherein the plurality of subband signals comprise different subbands of the broadband signal,
wherein the second filterbank comprises a polyphase filter,
wherein the data receiver comprises a decoder that is configured to extract detected partial data packets from the respective subband signals of the second filterbank by using detection parameters, and
wherein a sampling rate $f_{IM}$ of the plurality of subband signals provided by the second filterbank for decoding the partial data packets is greater than a sampling rate $f_{DET}$ of the plurality of subband signals provided by the first filterbank for detecting the partial data packets and/or wherein a number of subband signals $N_{IM}$ of the subband signals provided by the second filterbank for decoding the partial data packets is lower than a number of subband signals N of the subband signals provided by the first filterbank for detecting the partial data packets.

35. Data receiver according to claim 34,
wherein the filterbank comprises an N point DFT or N point FFT, wherein N is the number of points used to calculate the DFT or FFT which is equal to the number N of subband signals.

36. Data receiver according to claim 34,
wherein the filterbank comprises an N channel mixer, wherein N is the number of subband signals.

37. Data receiver according to claim 34,
wherein the filterbank is configured to perform undersampling of the received broadband signal such that a sampling rate of the plurality of subband signals is lower than a sampling rate of the received broadband signal.

38. Data receiver according to claim 34,
wherein the second filterbank comprises an N point DFT or N point FFT, wherein N is the number of points used to calculate the DFT or FFT which is equal to the number N of subband signals.

39. Data receiver according to claim 34,
wherein the second filterbank is configured to perform undersampling of the received broadband signal such that a sampling rate of the plurality of subband signals is lower than a sampling rate of the received broadband signal.

40. Data receiver according to claim 34,
wherein the second filterbank is configured to divide the broadband signal into a plurality of subband signals with overlapping subbands,
wherein the subbands overlap by at least one bandwidth of one of the partial data packets.

41. Data receiver according to claim 34,
wherein the second filterbank is configured to divide the broadband signal into a plurality of subband signals with overlapping subbands, wherein, when dividing the broadband signal, a sum of a bandwidth of a passband for one of the subband signals and of a stop bandwidth of a subband signal adjacent to the subband signal is not greater than twice the sampling rate of the plurality of subband signals.

42. Data receiver according to claim 34,
wherein the first filterbank and the second filterbank comprise different filter characteristics.

43. Method for receiving a broadband signal, wherein the broadband signal comprises at least two partial data packets that are distributed across different frequencies, comprising:
filtering the received broadband signal with a first filterbank to divide the received broadband signal into a plurality of subband signals for detecting the partial data packets, wherein the plurality of subband signals comprise different subbands of the broadband signal,
wherein the first filterbank comprises a polyphase filter,
detecting the at least two partial data packets in the different subbands of the plurality of subband signals of the first filterbank to provide detection parameters for the detected partial data packets,
filtering the received broadband signal with a second filterbank to divide the received broadband signal into a plurality of subband signals for decoding the partial data packets, wherein the plurality of subband signals comprise different subbands of the broadband signal,
wherein the second filterbank comprises a polyphase filter,
extracting the detected partial data packets from the respective subband signals of the second filterbank by using detection parameters and decoding the extracted partial data packets, and
wherein a sampling rate $f_{IM}$ of the plurality of subband signals provided by the second filterbank for decoding the partial data packets is greater than a sampling rate $f_{DET}$ of the plurality of subband signals provided by the first filterbank for detecting the partial data packets and/or wherein a number of subband signals $N_{IM}$ of the subband signals provided by the second filterbank for decoding the partial data packets is lower than a number of subband signals N of the subband signals provided by the first filterbank for detecting the partial data packets.

44. A non-transitory digital storage medium having a computer program stored thereon to perform the method for receiving a broadband signal, wherein the broadband signal comprises at least two partial data packets that are distributed across different frequencies, the method comprising:
filtering the received broadband signal with a first filterbank to divide the received broadband signal into a plurality of subband signals for detecting the partial data packets, wherein the plurality of subband signals comprise different subbands of the broadband signal,
wherein the first filterbank comprises a polyphase filter,
detecting the at least two partial data packets in the different subbands of the plurality of subband signals of the first filterbank to provide detection parameters for the detected partial data packets,
filtering the received broadband signal with a second filterbank to divide the received broadband signal into a plurality of subband signals for decoding the partial data packets, wherein the plurality of subband signals comprise different subbands of the broadband signal,
wherein the second filterbank comprises a polyphase filter,
extracting the detected partial data packets from the respective subband signals of the second filterbank by using detection parameters and decoding the extracted partial data packets,
wherein a sampling rate $f_{IM}$ of the plurality of subband signals provided by the second filterbank for decoding the partial data packets is greater than a sampling rate $f_{DET}$ of the plurality of subband signals provided by the first filterbank for detecting the partial data packets and/or wherein a number of subband signals $N_{IM}$ of the subband signals provided by the second filterbank for decoding the partial data packets is lower than a number of subband signals N of the subband signals provided by the first filterbank for detecting the partial data packets, and
when said computer program is run by a computer.

* * * * *